US012400602B2

(12) United States Patent
Kawachi

(10) Patent No.: US 12,400,602 B2
(45) Date of Patent: Aug. 26, 2025

(54) DISPLAY DEVICE WITH CLAMP SWITCHING CIRCUIT

(71) Applicant: Xiamen Tianma Display Technology Co., Ltd., Xiamen (CN)

(72) Inventor: Genshiro Kawachi, Kanagawa (JP)

(73) Assignee: XIAMEN TIANMA DISPLAY TECHNOLOGY CO., LTD., Xiamen (CN)

( * ) Notice: Subject to any disclaimer, the term of this patent is extended or adjusted under 35 U.S.C. 154(b) by 0 days.

(21) Appl. No.: 18/530,672

(22) Filed: Dec. 6, 2023

(65) Prior Publication Data

US 2024/0212626 A1 Jun. 27, 2024

(30) Foreign Application Priority Data

Dec. 22, 2022 (JP) ................................ 2022-205194

(51) Int. Cl.
*G09G 3/32* (2016.01)
*G09G 3/3266* (2016.01)

(52) U.S. Cl.
CPC ... *G09G 3/3266* (2013.01); *G09G 2310/0213* (2013.01); *G09G 2310/08* (2013.01); *G09G 2320/0247* (2013.01); *G09G 2330/021* (2013.01)

(58) Field of Classification Search
CPC ............................................ G09G 3/30–3291
See application file for complete search history.

(56) References Cited

U.S. PATENT DOCUMENTS

| | | | | |
|---|---|---|---|---|
| 2014/0168182 | A1 | 6/2014 | Yamamoto et al. | |
| 2017/0249901 | A1 | 8/2017 | Nakamura | |
| 2021/0158763 | A1* | 5/2021 | Hung | G09G 3/3291 |
| 2022/0293041 | A1* | 9/2022 | Chang | G09G 3/32 |
| 2023/0326388 | A1* | 10/2023 | In | G09G 3/2092 |
| 2024/0144884 | A1* | 5/2024 | Lu | G09G 3/3225 |
| 2024/0177673 | A1* | 5/2024 | Kim | G09G 3/3266 |

* cited by examiner

*Primary Examiner* — Roy P Rabindranath
(74) *Attorney, Agent, or Firm* — NIXON & VANDERHYE

(57) ABSTRACT

Each of pixel circuits is controlled by at least a first scanning signal and a second scanning signal. A first scanning circuit supplies the first scanning signal to first scanning lines. A second scanning circuit supplies the second scanning signal to second scanning lines. The first scanning signal is a scanning signal that turns ON/OFF an n-type transistor in a pixel circuit for refresh operation including writing a data voltage to the pixel circuit. The second scanning signal is a scanning signal that controls whether to supply lighting current to a light-emitting element in the pixel circuit. An output of a clamp switching circuit is connected to a first scanning signal line. The clamp switching circuit is controlled by the second scanning signal to keep the first scanning signal line at a low-level potential for at least a part of an emission period.

9 Claims, 18 Drawing Sheets

DISPLAY DEVICE WITH CLAMP SWITCHING CIRCUIT

CROSS-REFERENCE TO RELATED APPLICATIONS

This non-provisional application claims priority under 35 U.S.C. § 119(a) on Patent Application No. 2022-205194 filed in Japan on Dec. 22, 2022, the entire content of which is hereby incorporated by reference.

BACKGROUND

This disclosure relates to a display device.

Display devices including luminous elements such as an organic light-emitting diode (OLED) display device are widely available. These display devices include a driving circuit that serially output a scanning signal to write data signals to pixels. One or more kinds of scanning signals can be used to write data.

Low-temperature polycrystalline oxide (LTPO) technology that integrates low-temperature polysilicon (LTPS) thin-film transistors (TFTs) and oxide semiconductor TFTs such as IGZO TFTs is increasingly applied to display panels. This technology enables a design taking advantages of device characteristics, for example, disposing an oxide semiconductor TFT at a location where leakage current causes a problem and disposing an LTPS TFT at a location where a driving ability is required.

The LTPO technology can be utilized to reduce the power consumption of OLEDs. One of the techniques to reduce the power consumption of OLEDs is lowering the data refresh frequency from conventional 60 Hz to almost 1 Hz to reduce the power consumption of the data driver in data refresh. To attain a low data refresh frequency, it is necessary to reduce charge leakage from a storage capacitive element Cst in a pixel holding a data signal voltage that determines the amount of lighting current for an OLED. For this reason, an n-type oxide semiconductor TFT that generates less leakage current is employed for the switching TFT connected to the storage capacitive element Cst and a p-type LTPS TFT having a high driving ability is employed for the TFT that transfers lighting current to the OLED element.

SUMMARY

An aspect of this disclosure is a display device including a display region including a plurality of pixel circuits, a first scanning circuit, a second scanning circuit, and a clamp switching circuit. Each of the plurality of pixel circuits is controlled by at least a first scanning signal and a second scanning signal. The first scanning circuit supplies the first scanning signal to first scanning lines for the plurality of pixel circuits. The second scanning circuit supplies the second scanning signal to second scanning lines for the plurality of pixel circuits. The first scanning signal is a scanning signal that turns ON/OFF an n-type transistor in a pixel circuit for refresh operation including writing a data voltage to the pixel circuit. The second scanning signal is a scanning signal that controls whether to supply lighting current to a light-emitting element in the pixel circuit. An output of the clamp switching circuit is connected to a first scanning signal line. The clamp switching circuit is controlled by the second scanning signal to keep the first scanning signal line at a low-level potential for at least a part of an emission period of the light-emitting element.

It is to be understood that both the foregoing general description and the following detailed description are exemplary and explanatory and are not restrictive of this disclosure.

EMBODIMENTS

Figure 1:
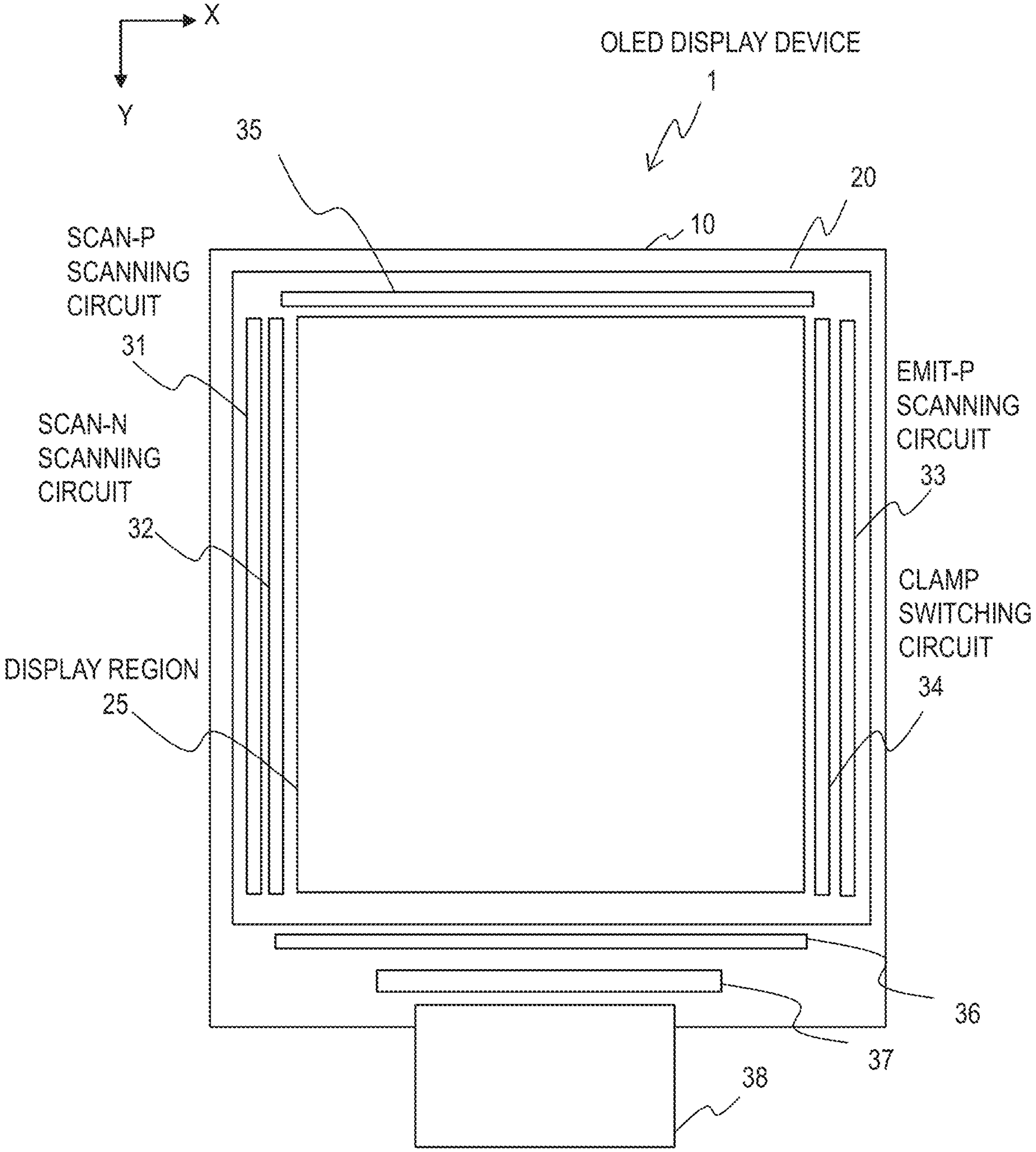
FIG. 1 schematically illustrates a configuration example of an OLED display device.

Embodiments of this disclosure will be described with reference to the accompanying drawings. It should be noted that the embodiments are merely examples to implement this disclosure and are not to limit the technical scope of this disclosure.

Overview

Described in the following are circuit configurations applicable to a shift register for display devices such as an organic light-emitting diode (OLED) display device. The circuits disclosed in the following are applicable to display devices including luminous elements different from OLED display devices.

A pixel circuit related to an embodiment of this specification utilizes LTPO technology that integrates low-temperature polysilicon (LTPS) thin-film transistors (TFTs) and oxide semiconductor TFTs such as IGZO TFTs. The term LTPO stands for low-temperature polycrystalline oxide.

This circuit employs PMOS-type (also simply referred to as p-type) of LTPS TFTs and NMOS-type (also simply referred to as n-type) of oxide semiconductor TFTs.

The LTPO technology is utilized to reduce the power consumption of OLEDs. One of the techniques to reduce the power consumption of OLEDs is lowering the data refresh frequency from conventional 60 Hz to almost 1 Hz to reduce the power consumption of the data driver in data refresh. To attain a low data refresh frequency, it is necessary to reduce charge leakage from a storage capacitive element Cst in a pixel. For this reason, an n-type oxide semiconductor TFT that generates less leakage current is employed for the switching TFT connected to the storage capacitive element Cst and a p-type LTPS TFT having a high driving ability is employed for the TFT that transfers lighting current to the OLED element.

For a scanning circuit that serially selects pixel rows, p-type LTPS TFTs having high mobility are preferably employed because of a demand for a slim bezel. The logical low level for an n-type TFT to be included in a pixel circuit is a logical high level for a p-type TFT. The logical high level for a TFT is a potential level that turns on the TFT and the logical low level is a potential level that turns off the TFT. That is to say, the logical low level for an n-type TFT is a level of a physically low potential and the logical high level is a level of a physically high potential. On the other hand, the logical low level for a p-type TFT is a level of a physically high potential and the logical high level is a level of a physically low potential.

To drive the scanning signal for a pixel circuit including an n-type TFT with a p-type TFT in a shift register circuit, the p-type TFT is required to hold the logical high-level potential of the scanning signal for almost one frame period. In a low data refresh rate operation, the p-type TFT is required to maintain the logical high-level potential of the scanning signal for a plurality of frame periods. The low data refresh rate operation writes a data signal to a pixel circuit at a lower frequency than a constant frame rate in the normal operation.

This p-type TFT is driven with charge stored in a capacitor in the shift register circuit. Accordingly, when the driving frequency is low, the stored charge may leak from the capacitor to vary the output potential of the p-type TFT.

If the logical high-level potential for the p-type transistor in the shift register circuit falls (the physical potential rises) within a frame period because of the low driving frequency, the physical potential of the selection signal for the n-type TFT in the pixel rises. When the logical high-level potential in the shift register falls below a certain level, the n-type TFT in the pixel turns on weakly. This means that the leakage current of the n-type TFT connected to the storage capacitive element Cst increases and as a result, the storage capacitive element Cst in the pixel loses charge.

The charge loss of the storage capacitive element Cst caused by leakage varies the lighting current (brightness of the light); low-frequency flickers are observed. Especially for a shift register circuit including only p-type TFTs, it is hard to generate a signal that maintains a physical low-level potential (a logical high level for p-type TFTs) for most of the operating time. Especially in the case where the frequency is low, the shift register circuit may not be able to maintain a physical low-level potential, causing elevation of the potential of the gate signal for the n-type TFT in the pixel circuit.

An embodiment of this specification provides a display device with a clamp switching circuit for maintaining the potential of the scanning line for an n-type TFT in a pixel circuit at a logical low level (physically low potential level) for the n-type TFT for a specific period. The specific period includes at least a part of an emission period. The pixel circuit can be an LTPO-type pixel circuit including n-type TFTs and p-type TFTs. The clamp switching circuit includes an n-type TFT and a capacitive element. The n-type TFT supplies a physical low-level potential from a power line to the scanning line when the TFT is ON. The capacitive element holds a gate voltage that keeps the n-type TFT ON.

An embodiment of this specification controls ON/OFF of the n-type TFT in the clamp switching circuit with an emission control signal for a pixel circuit. Degradation of the display quality can be prevented with this efficient configuration. The circuits in the embodiments of this specification are applicable to a luminescent type of display devices that employ or do not employ low frame-rate control.

Hereinafter, embodiments will be described specifically with reference to the drawings. Elements common to the drawings are denoted by the same reference signs and some elements in the drawings are exaggerated in size or shape for clear understanding of the description.

Overall Configuration

FIG. 1 schematically illustrates a configuration example of an OLED display device 1 of a display device in an embodiment of this specification. The horizontal direction in FIG. 1 is an X-axis direction and the vertical direction is a Y-axis direction perpendicular to the X-axis direction. The OLED display device 1 includes a thin-film transistor (TFT) substrate 10 on which OLED elements (light-emitting elements) are fabricated and a structural encapsulation unit 20 for encapsulating the OLED elements.

In the periphery of a display region (pixel circuit array) 25 of the TFT substrate 10, a SCAN-P scanning circuit 31, a SCAN-N scanning circuit 32, an EMIT-P scanning circuit 33, a clamp switching circuit 34, a pixel circuit array protection circuit 35, a demultiplexer 36, and a driver IC 37 are disposed. The driver IC 37 is connected to the external devices via flexible printed circuits (FPC) 38.

The driver IC 37 is mounted with an anisotropic conductive film (ACF), for example. The driver IC 37 provides power and a timing signal (control signal) to the scanning circuits 31 and 33 and provides power to the clamp switching circuit 34. Furthermore, the driver IC 37 provides a data signal to the demultiplexer 36.

The demultiplexer 36 outputs output of one pin of the driver IC 37 to d data lines serially (d is an integer greater than 1). The demultiplexer 36 changes the output data line for the data signal from the driver IC 37 d times per scanning period to drive d times as many data lines as output pins of the driver IC 37.

The display region 25 includes a plurality of pixel circuits and each pixel circuit controls light emission of an OLED element. In an example of a color OLED display device, each OLED element emits light in one of the colors of red, blue, and green. The plurality of pixel circuits constitute a pixel circuit array.

As will be described later, each pixel circuit includes a driving TFT (driving transistor), a storage capacitor for holding a signal voltage that determines driving current of the driving TFT, and an emission control TFT for controlling whether to supply lighting current to the OLED element. The data signal transmitted by a data line is adjusted for the threshold voltage Vth of the driving TFT and stored to the storage capacitor. The voltage of the storage capacitor determines the gate voltage (Vgs) of the driving TFT. The adjusted control voltage of the storage capacitor changes the conductance of the driving TFT in an analog manner and the driving TFT supplies a forward-bias current corresponding to a brightness level to the OLED element.

As will be described later, a pixel circuit in an embodiment of this specification includes n-conductive type of TFTs (n-type TFTs) and p-conductive type of TFTs (p-type TFTs). The n-type TFTs can be oxide semiconductor TFTs and the p-type TFTs can be low-temperature polysilicon TFTs. The n-type TFTs and the p-type TFTs can be made of other semiconductor materials.

Each of the SCAN-P scanning circuit 31 and the SCAN-N scanning circuit 32 serially outputs scanning signals to make each pixel circuit row perform operation to write data signals to individual pixel circuits therein. The operation to write a data signal can include resetting the potentials of specific nodes, compensating for variation in the threshold voltage of the driving TFT, and writing a data signal to the storage capacitor, as will be described later.

The SCAN-P scanning circuit 31 drives scanning lines on the TFT substrate 10 to serially output scanning signals for the p-type TFTs in the pixel circuits. The SCAN-N scanning circuit 32 drives other scanning lines on the TFT substrate 10 to serially output scanning signals for the n-type TFTs in the pixel circuits. Each of the scanning circuits 31 and 32 can output logical high-level signals (selection pulses) to one or more scanning lines simultaneously. The logical high-level signal is a signal to turn on the transistor of the control target and a logical low-level signal is a signal to turn off the transistor of the control target.

The EMIT-P scanning circuit 33 serially outputs emission control signals for controlling whether to light a pixel circuit row. The emission control signal turns ON/OFF the emission control TFT in each pixel circuit. The emission control TFT in an embodiment of this specification is a p-type TFT. The scanning circuit 33 can output logical high-level signals (selection pulses) to one or more emission control signal lines simultaneously.

The clamp switching circuit 34 is a circuit for keeping the scanning lines driven by the SCAN-N scanning circuit 32 at a logical low level or a physical low-level potential, as will be described later. This operation suppresses potential drift of the SCAN-N signal line driven by the SCAN-N scanning circuit 32 and the resultant occurrence of flickers.

Configuration of Pixel Circuit

Figure 2:
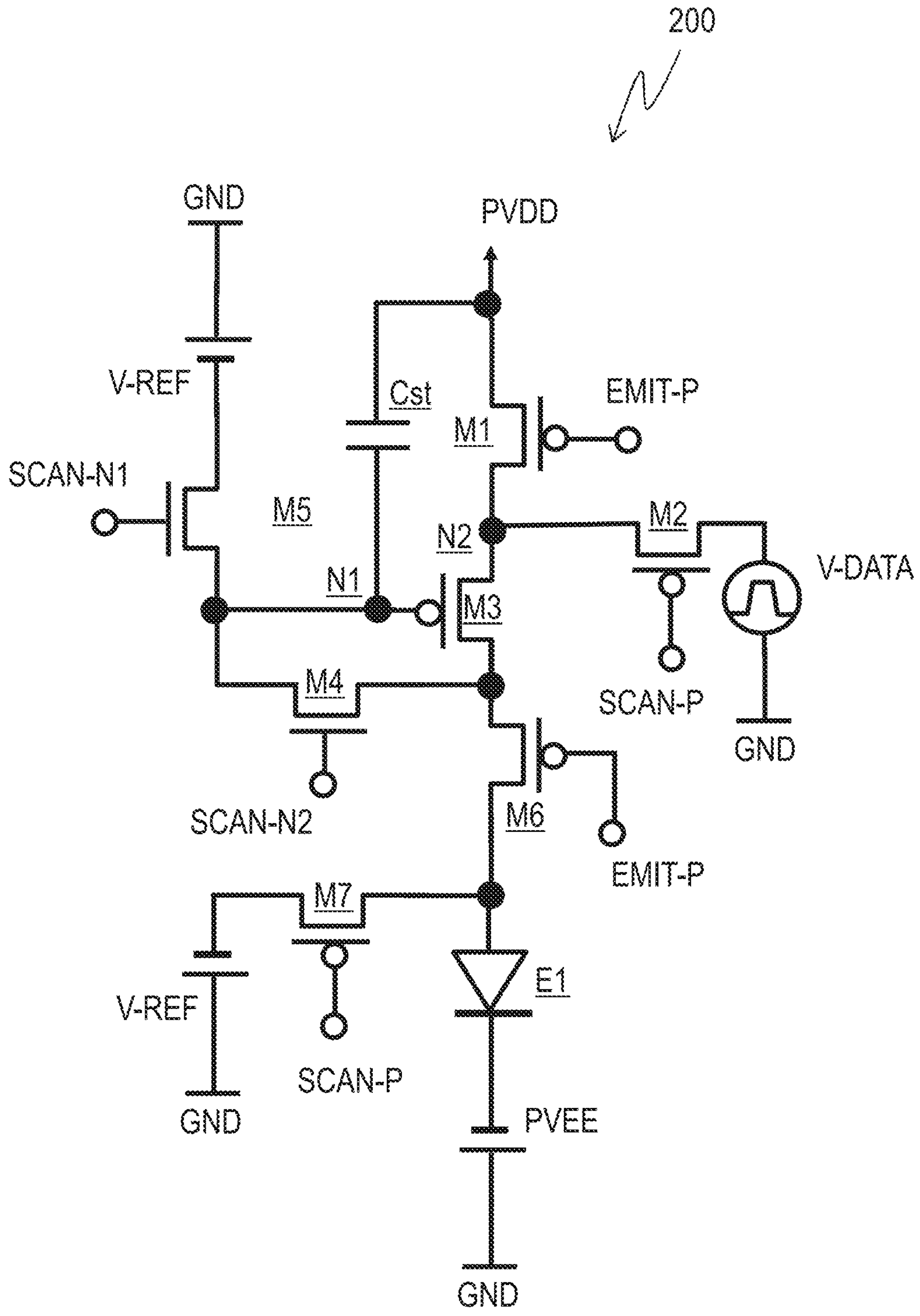
FIG. 2 illustrates a configuration example of a pixel circuit.

FIG. 2 illustrates a configuration example of a pixel circuit 200 in an embodiment of this specification. The pixel circuit 200 includes a storage capacitor for holding a control voltage that controls the amount of electric current of the driving transistor. The control voltage held by the storage capacitor is also referred to as driving voltage of the driving transistor. The storage capacitor holds a control voltage in accordance with a data signal (potential thereof) transmitted by a data line from the driver IC 37. The control voltage is a voltage after adjustment for the threshold voltage Vth of the driving TFT (Vth compensation) is applied to a data signal and can be referred to as adjusted data voltage.

The pixel circuit 200 adjusts a data signal supplied from the driver IC 37 and controls light emission of the OLED element E1 with the adjusted signal. The pixel circuit 200 includes seven transistors (TFTs) M1 to M7 each having a gate, a source, and a drain. In this example, the transistors M1, M2, M3, M6, and M7 are p-type TFTs and the transistors M4 and M5 are n-type TFTs. The transistors except for the driving transistor M3 are switching transistors. At least one of the transistors can be of the other conductive type.

The pixel circuit 200 further includes a storage capacitive element Cst. The storage capacitive element Cst is connected between an anode power supply for supplying a power supply potential PVDD and the gate of the driving transistor M3 (a node N1). The storage capacitive element Cst holds the gate-source voltage of the driving transistor M3.

The transistor M3 is a driving transistor for controlling the amount of the lighting current to the OLED element E1. The driving transistor M3 controls the amount of current to be supplied from the anode power supply to the OLED element E1 in accordance with the voltage held in the storage capacitive element Cst. The cathode of the OLED element E1 is connected to a cathode power supply for supplying a cathode potential PVEE.

The transistors M1 and M6 are emission control transistors for controlling whether to light the OLED element E1. The transistor M1 is connected to the anode power supply from one of the source/drain regions and switches ON/OFF the supply of current to the driving transistor M3 connected from the other source/drain region. The transistor M6 is connected to the drain of the driving transistor M3 from one of the source/drain regions and switches ON/OFF the supply of current to the OLED element E1 connected from the other source/drain region. The transistors M1 and M6 are both controlled by the emission control scanning signal EMIT-P input from the EMIT-P scanning circuit 33 to the gate. The source/drain is a generic term of a source or a drain. A source/drain can become a source or a drain depending on the direction of the flow of carriers in the channel region of the transistor.

The transistor M7 works to supply a reference potential (reset potential) V-REF to the anode of the OLED element E1. When the transistor M7 is turned ON by a selection signal SCAN-P input from the SCAN-P scanning circuit 31 to the gate, the transistor M7 supplies a fixed reference potential V-REF from a reference power supply to the anode of the OLED element E1. The reference potential V-REF can be the ground (GND) potential or a potential lower than that. The other end of the reference power supply is connected to the ground.

The transistor M5 controls whether to supply the reference potential (reset potential) V-REF to the gate of the driving transistor M3. When the transistor M5 is turned ON by a selection signal SCAN-N1 input from the SCAN-N scanning circuit 32 to the gate, the transistor M5 supplies a fixed reference potential V-REF from a reference power supply connected from one of the source/drain regions to the gate of the driving transistor M3. The other end of the reference power supply is connected to the ground. The reference potential to the anode electrode of the OLED element E1 and the reference potential to the gate of the driving transistor M3 can be different.

The transistor M2 is a selection transistor for supplying a data signal. The transistor M2 switches between supplying and not supplying a data signal to the storage capacitive element Cst. The gate voltage of the transistor M2 is controlled by the selection signal SCAN-P input from the SCAN-P scanning circuit 31 to the gate. When the selection transistor M2 is ON, it supplies a data signal V-DATA supplied from the driver IC 37 via a data line to the storage capacitive element Cst.

In this example, the source/drain regions of the transistor M2 are connected between the data line and the source of the driving transistor M3 (a node N2). The transistor M4 is connected between the drain and the gate of the driving transistor M3. The transistor M4 is controlled by a selection signal SCAN-N2 supplied from the SCAN-N scanning circuit 32. The transistor M4 works to compensate for variation in the threshold voltage Vth of the driving transistor M3. The transistor M4 switches between connection and disconnection of the gate and the drain of the driving transistor M3. When the transistor M4 is ON, the driving transistor M3 works as a diode-connected transistor. When the transistor M4 is OFF, the driving transistor M3 works as a normal transistor.

The data signal V-DATA from the data line is supplied to the storage capacitive element Cst via the transistor M2 being ON, the driving transistor M3 being diode-connected, and the transistor M4 being ON. During the transmission, Vth compensation is applied. The storage capacitive element Cst holds the gate-source voltage of the driving transistor M3 and controls the amount of current to be supplied from the driving transistor M3 to the OLED element E1. As described above, the storage capacitive element Cst holds a voltage adjusted depending on the threshold voltage Vth of the driving transistor M3.

Configuration and Operation of Clamp Switching Circuit

Figure 3A:
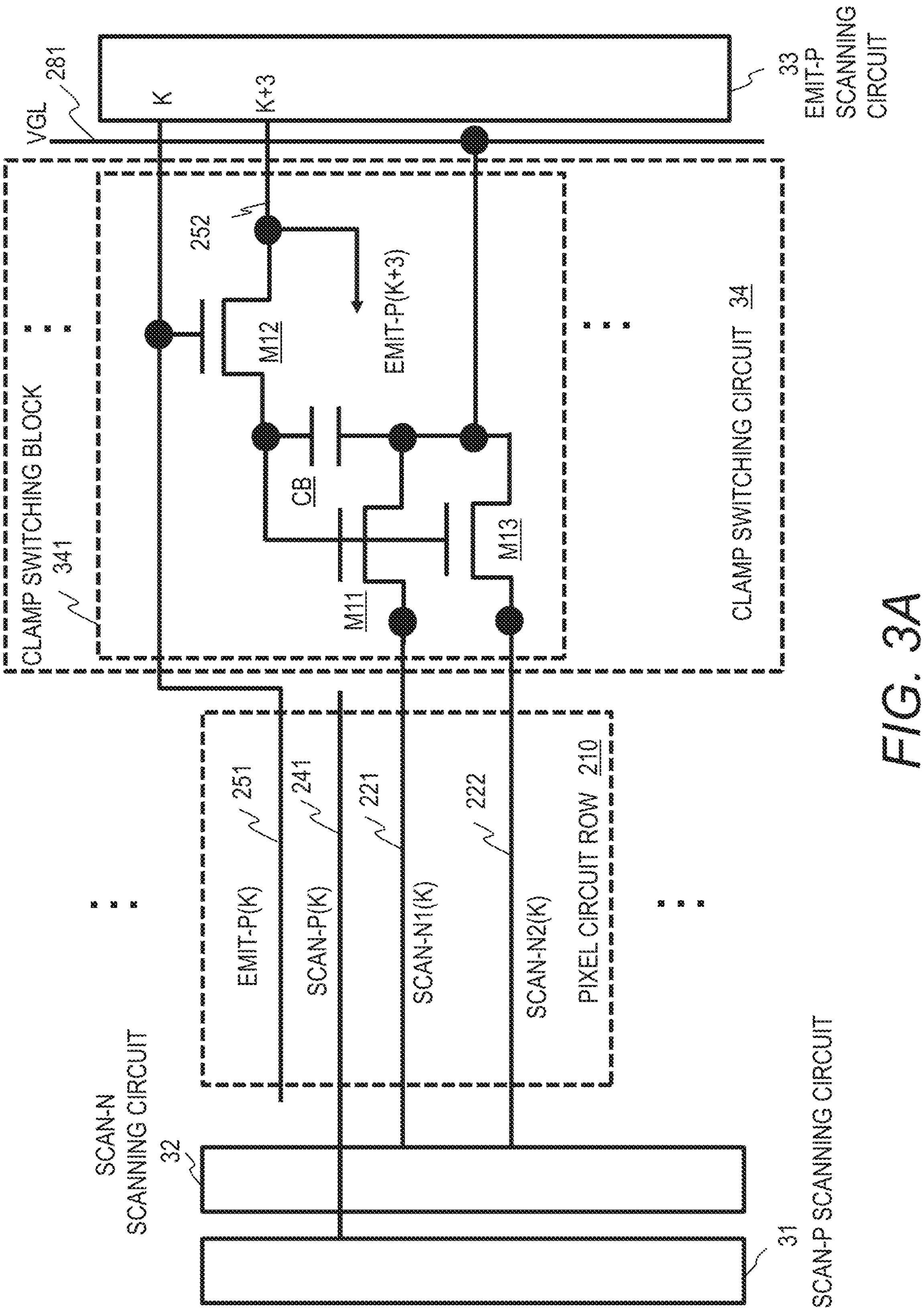
FIG. 3A illustrates a configuration example of a clamp switching block included in a clamp switching circuit.

The clamp switching circuit 34 is described. FIG. 3A illustrates a configuration example of a clamp switching block 341 included in the clamp switching circuit 34. One clamp switching block 341 supplies a logical low-level or a physical low-level potential for at least a part of a period the gate potentials of one or more n-type TFTs in one pixel circuit row 210 are to be maintained at a logical low level.

The following description uses the configuration example of a pixel circuit 200 described with reference to FIG. 2. As described with reference to FIG. 2, each pixel circuit 200 in the K-th pixel circuit row is controlled by the SCAN-N1(K) signal, the SCAN-N2(K) signal, the SCAN-P(K) signal, and the EMIT-P(K) signal, where K is a natural number. The SCAN-N scanning circuit 32 is an example of a first scanning circuit and the EMIT-P scanning circuit 33 is an example of a second scanning circuit.

The emission control scanning signal line 251 is the K-th signal line driven by the EMIT-P scanning circuit 33 and transmits the EMIT-P(K) signal. The EMIT-P(K) signal is an emission control signal (scanning signal) to be transmitted by the K-th emission control scanning signal line 251 of the EMIT-P scanning circuit 33.

The scanning line 241 is the K-th signal line driven by the SCAN-P scanning circuit 31 and transmits the SCAN-P(K) signal. The SCAN-P(K) signal is a selection signal (scanning signal) to be transmitted by the K-th scanning line 241 of the SCAN-P scanning circuit 31.

The scanning line 221 transmits the SCAN-N1(K) signal. The SCAN-N1(K) signal is the SCAN-N1 signal for the K-th pixel circuit row. The scanning line 221 is the K-th SCAN-N1 signal line. The SCAN-N1(K) signal is a selection signal (scanning signal) output by the SCAN-N scanning circuit 32. The SCAN-N1(K) signal is identical to the SCAN-N2(K−1) signal for the previous pixel circuit row. Accordingly, the scanning line 221 can be branched from the K-th terminal of the SCAN-N scanning circuit 32, together with the scanning line for transmitting the SCAN-N2(K−1) signal to the (K−1)th pixel row. Alternatively, the SCAN-N scanning circuit 32 can include two shift register circuits and output the scanning signals SCAN-N1 and SCAN-N2 from the terminals of the different shift register circuits.

The scanning line 222 transmits the SCAN-N2(K) signal. The SCAN-N2(K) signal is the SCAN-N2 signal for the K-th pixel circuit row. The scanning line 222 is the K-th SCAN-N2 signal line. The SCAN-N2(K) signal is a selection signal (scanning signal) output by the SCAN-N scanning circuit 32. The SCAN-N2(K) signal is identical to the SCAN-N1(K+1) signal for the next pixel circuit row. Accordingly, the scanning line 222 can be branched from the (K+1)th terminal of the SCAN-N scanning circuit 32, together with the scanning line for transmitting the SCAN-N1(K+1) signal to the (K+1)th pixel row. Alternatively, the SCAN-N scanning circuit 32 can include two shift register circuits and output the scanning signals SCAN-N1 and SCAN-N2 from the terminals of the different shift register circuits.

A clamp switching block 341 includes three n-type transistors M11, M12, and M13. These are thin-film transistors and can be made of the same semiconductor material as the n-type transistors in the pixel circuits. The transistors M11 and M13 are clamp switching transistors. The clamp switching block 341 further includes a capacitive element CB. The transistors M11 and M13 are examples of a first n-type switching transistor and the transistor M12 is an example of a second n-type switching transistor.

The drain of the clamp switching transistor M11 is connected to the K-th SCAN-N1 signal line 221. The gate of the clamp switching transistor M11 is connected to the (K+3)th emission control scanning signal line 252 via the switching transistor M12. The source of the clamp switching transistor M11 is connected to a VGL power line 281 for supplying a low-level potential VGL.

The drain of the clamp switching transistor M13 is connected to the K-th SCAN-N2 signal line 222. The gate of the clamp switching transistor M13 is connected to the (K+3)th emission control scanning signal line 252 via the switching transistor M12. The source of the clamp switching transistor M13 is connected to the VGL power line 281 for supplying the low-level potential VGL.

The gate of the switching transistor M12 is connected to the K-th emission control scanning signal line 251. This means the switching transistor M12 is turned ON/OFF by the emission control scanning signal for the K-th pixel circuit row. The clamp switching transistors M11 and M13 are controlled to be ON/OFF by the emission control scanning signal for the (K+3)th pixel circuit row supplied via the source/drain regions of the switching transistor M12 and the voltage of the capacitive element CB.

The capacitive element CB is connected between the gate and the source of the clamp switching transistor M11 and also between the gate and the source of the clamp switching transistor M13. The capacitive element CB holds a voltage for keeping the clamp switching transistors M11 and M13 ON.

Figure 3B:
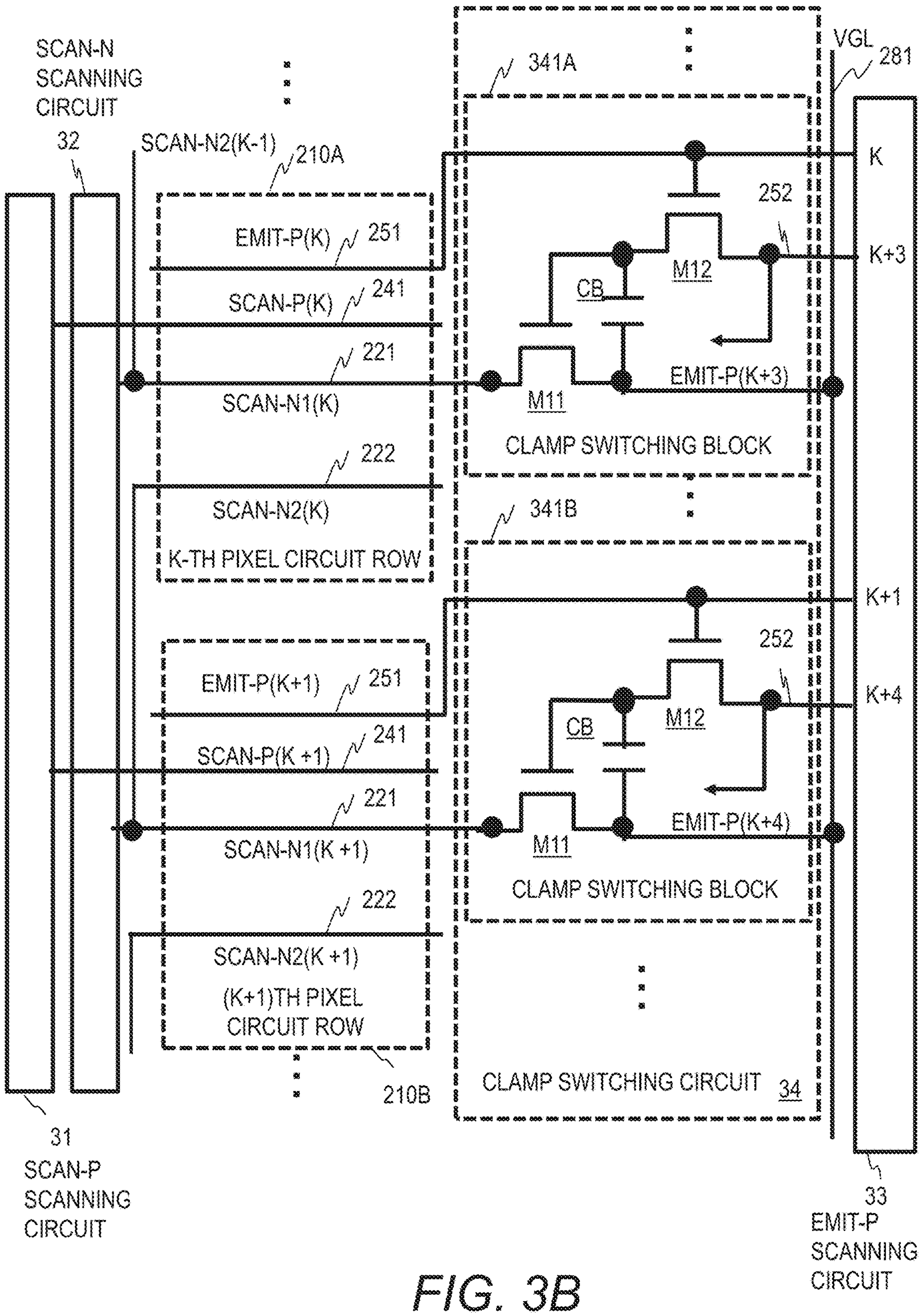
FIG. 3B illustrates another configuration example of a clamp switching block included in a clamp switching circuit.

FIG. 3B illustrates another configuration example of a clamp switching block. Differences from the configuration example of FIG. 3A are mainly described. A clamp switching block 341A is a clamp switching block for the K-th pixel circuit row 210A and a clamp switching block 341B is a clamp switching block for the (K+1)th pixel circuit row 210B. The clamp switching blocks 341A and 341B do not include a transistor M13.

The SCAN-N1(K) signal is identical to the SCAN-N2 (K−1) signal for the previous pixel circuit row. Accordingly, the scanning line 221 is branched from the K-th terminal of the SCAN-N scanning circuit 32, together with the scanning line for transmitting the SCAN-N2(K−1) signal to the (K−1) th pixel row. The SCAN-N2(K) signal is identical to the SCAN-N1(K+1) signal for the next pixel circuit row. Accordingly, the scanning line 222 is branched from the (K+1)th terminal of the SCAN-N scanning circuit 32, together with the scanning line for transmitting the SCAN-N1(K+1) signal to the (K+1)th pixel row.

Figure 4:
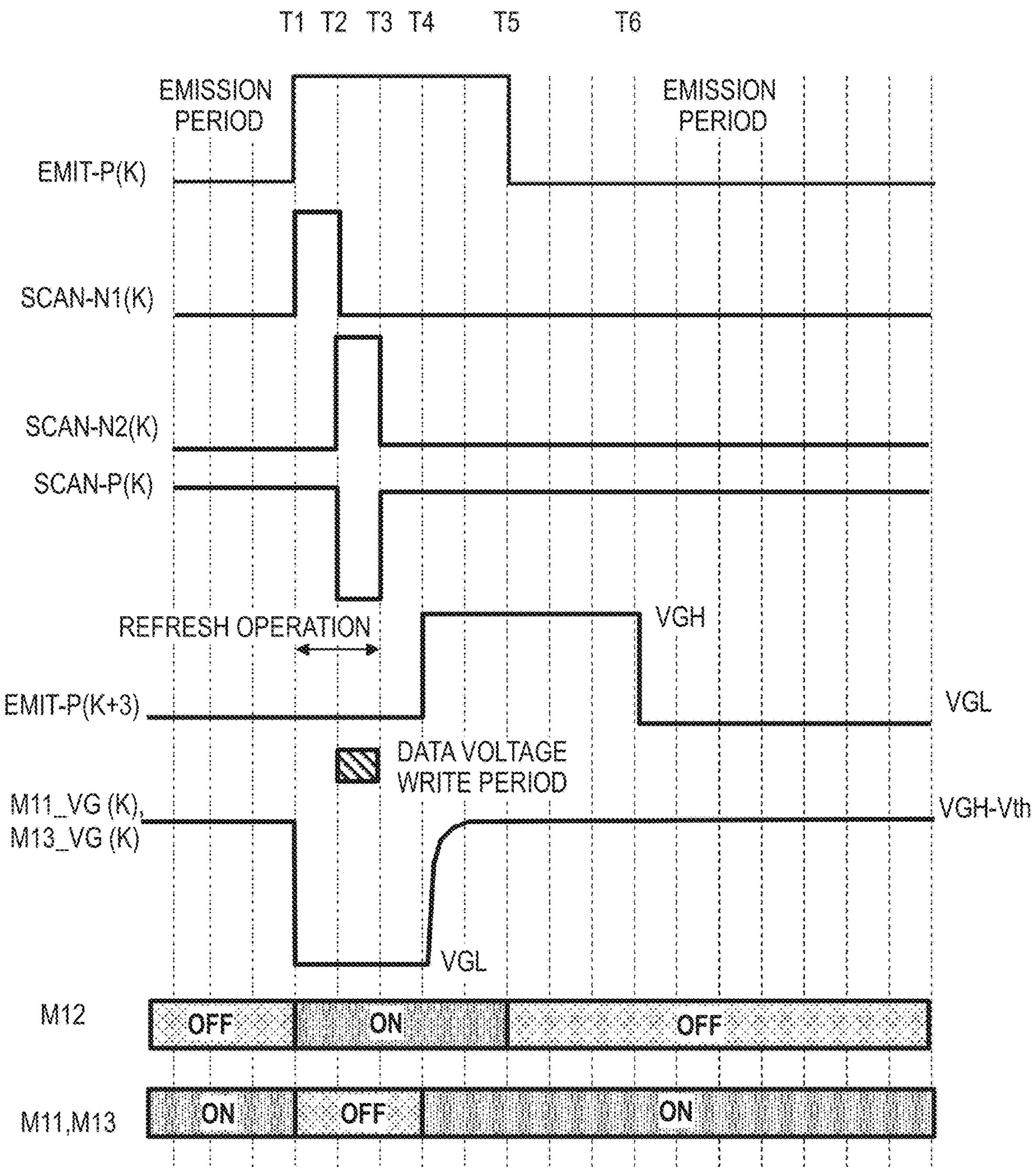
FIG. 4 is a timing chart of the signals for controlling the clamp switching block in FIG. 3A.

FIG. 4 is a timing chart of the signals for controlling the clamp switching block 341 in FIG. 3A. The levels of each signal in the chart correspond to physical potential levels.

The high-level potential of each signal is VGH and the low-level potential is VGL. The scanning signal SCAN-N1(K) and the scanning signal SCAN-N2(K) are at a high-level potential for a shorter time than they are at a low-level potential in one frame period.

The period prior to a time T1 is an emission period. At the time T1, the emission control scanning signal EMIT-P(K) changes from a low-level potential to a high-level potential. In response, the transistors M1 and M6 in the pixel circuit 200 turn OFF and the OLED element E1 stops emitting light. Furthermore, the scanning signal SCAN-N1(K) changes from a low-level potential to a high-level potential. In response, the transistor M5 in the pixel circuit 200 turns ON to supply a reference potential V-REF to the gate of the driving transistor M3.

In response to the change of the emission control scanning signal EMIT-P(K), the switching transistor M12 in the clamp switching block 341 turns from OFF to ON. The emission control scanning signal EMIT-P(K+3) is at a low-level potential at the time T1. The gate potentials (M11_VG(K), M13_VG(K)) of the clamp switching transistors M11 and M13 change from (VGH−Vth) to VGL, where VGH is a high-level potential, Vth is the threshold voltage of the switching transistor M12, and VGL is a low-level potential. Accordingly, the clamp switching transistors M11 and M13 turn from ON to OFF.

When the clamp switching transistor M11 is ON, the output of the clamp switching circuit 34 is connected to the scanning line 221. When the clamp switching transistor M11 is OFF, the output of the clamp switching circuit 34 is disconnected from the scanning line 221. The same description is applicable to the clamp switching transistor M13 and the scanning line 222.

At a subsequent time T2, the scanning signal SCAN-N1(K) changes from the high-level potential to the low-level potential. In response, the transistor M5 in the pixel circuit 200 turns OFF. The scanning signal SCAN-N2(K) changes from a low-level potential to a high-level potential. The scanning signal SCAN-P(K) changes from a high-level potential to a low-level potential. In response, the transistors M4 and M2 in the pixel circuit 200 turn ON and writing a threshold-compensated data voltage to the storage capacitive element Cst starts.

The emission control scanning signal EMIT-P(K) remains at the high-level potential and the emission control scanning signal EMIT-P(K+3) remains at the low-level potential. Accordingly, the states of the transistors M11, M12, and M13 do not change.

At a subsequent time T3, the scanning signal SCAN-N2(K) changes from the high-level potential to the low-level potential. The scanning signal SCAN-P(K) changes from the low-level potential to the high-level potential. In response, the transistors M4 and M2 in the pixel circuit 200 turn OFF to terminate the data voltage write to the storage capacitive element Cst.

The emission control scanning signal EMIT-P(K) remains at the high-level potential and the emission control scanning signal EMIT-P(K+3) remains at the low-level potential. Accordingly, the states of the transistors M11, M12, and M13 do not change.

At a subsequent time T4, the emission control scanning signal EMIT-P(K+3) changes from the low-level potential to a high-level potential. The potentials of the other signals do not change. In response to the change of the emission control scanning signal EMIT-P(K+3), a voltage (VGH−Vth−VGL) is stored between the ends of the capacitive element CB, where Vth is threshold voltage of M12. The gate-source voltages (M11_VG(K), M13_VG(K)) of the clamp switching transistors M11 and M13 change from VGL to (VGH−Vth). Accordingly, the clamp switching transistors M11 and M13 turn from OFF to ON.

As a result, the SCAN-N1(K) scanning line 221 and the SCAN-N2(K) scanning line 222 are connected to the VGL power line 281 via the clamp switching transistors M11 and M13 being ON and supplied with the low-level potential VGL.

At a subsequent time T5, the emission control scanning signal EMIT-P(K) changes from the high-level potential to the low-level potential. In response, the transistors M1 and M6 in the pixel circuit 200 turn ON and as a result, the OLED element E1 starts emitting light for the next frame. The other signals do not change.

In response to the change of the emission control scanning signal EMIT-P(K), the switching transistor M12 in the clamp switching block 341 turns from ON to OFF. Since the capacitive element CB holds a voltage, the clamp switching transistors M11 and M13 remain ON. The clamp switching transistors M11 and M13 are maintained to be ON until the time T1 of the next frame; the SCAN-N1(K) scanning line 221 and the SCAN-N2(K) scanning line 222 are connected to the VGL power line 281 via the clamp switching transistors M11 and M13 being ON and are fixed at the low-level potential VGL. As a result, the potentials of the SCAN-N1(K) scanning line 221 and the SCAN-N2(K) scanning line 222 do not elevate, preventing a malfunction of the pixel circuit 200.

At a subsequent time T6, the emission control scanning signal EMIT-P(K+3) changes from the high-level potential to the low-level potential. The other signals do not change. Since the switching transistor M12 is OFF at the time T6, the clamp switching transistors M11 and M13 are not affected by the potential change of the emission control scanning signal EMIT-P(K+3). From the time T6 to the beginning of the next frame, all signals keep their states without change.

In the example illustrated in FIG. 4, the periods from the time T1 to the time T2, from the time T2 to the time T3, and from the time T3 to the time T4 have the same length equal to a data voltage write period (one horizontal (1H) period). The period from the time T4 to the time T5 has a length twice as long as the data voltage write period and the period from the time T5 to the time T6 has a length three times as long as the data voltage write period.

During the period from the time T1 to the time T3 in which at least either the scanning signals SCAN-N1(K) or SCAN-N2(K) is at a physical high-level potential (a logical high level), the clamp switching transistors M11 and M13 are maintained to be OFF. This operation eliminates interference with appropriate writing of data signal to the pixel circuit 200.

In the example described with reference to FIG. 4, the clamp switching transistors M11 and M13 are maintained to be ON from the time T4 to the time T1 of the next frame. That is to say, the scanning lines 221 and 222 for the scanning signals SCAN-N1(K) and SCAN-N2(K) are connected to the VGL power line 281 and supplied with the low-level potential VGL from the VGL power line 281. This operation effectively prevents the low-level potentials of the scanning lines 221 and 222 from drifting to cause leakage of current from the n-type TFTs in the pixel circuit 200.

The example described with reference to FIG. 4 controls the clamp switching block 341 for the K-th pixel circuit row with the emission control scanning signals EMIT-P(K) and EMIT-P(K+3). In order to keep the clamp switching transistors M11 and M13 OFF during the period from the time T1 to the time T3, the emission control scanning signal EMIT-P for a different pixel circuit row can be used.

For example, an emission control scanning signal EMIT-P for a later stage than the emission control scanning signal EMIT-P(K) that turns on the clamp switching transistors M11 and M13 at a time not earlier than the time T3 can be used. Such an EMIT-P signal can be an emission control scanning signal EMIT-P(K+S) for any pixel circuit row after the emission control scanning signal EMIT-P(K+1), where S is an integer greater than 1. From the viewpoint to prevent a malfunction, S can be an integer greater than 2. Taking a smaller value for S enables the clamp switching transistors M11 and M13 to be ON for a longer time. In place of the emission control scanning signal EMIT-P(K), an emission control scanning signal EMIT-P preceding the emission control scanning signal EMIT-P(K) can be used.

In the example of FIG. 4, the clamp switching transistors M11 and M13 are ON from the start to the end of the emission period of each frame period. As described above, the clamp switching transistors M11 and M13 can be OFF in a part of the emission period and be ON in the other part. The same applies to the other examples to be described later with reference to FIG. 14 or 17.

Figure 5:
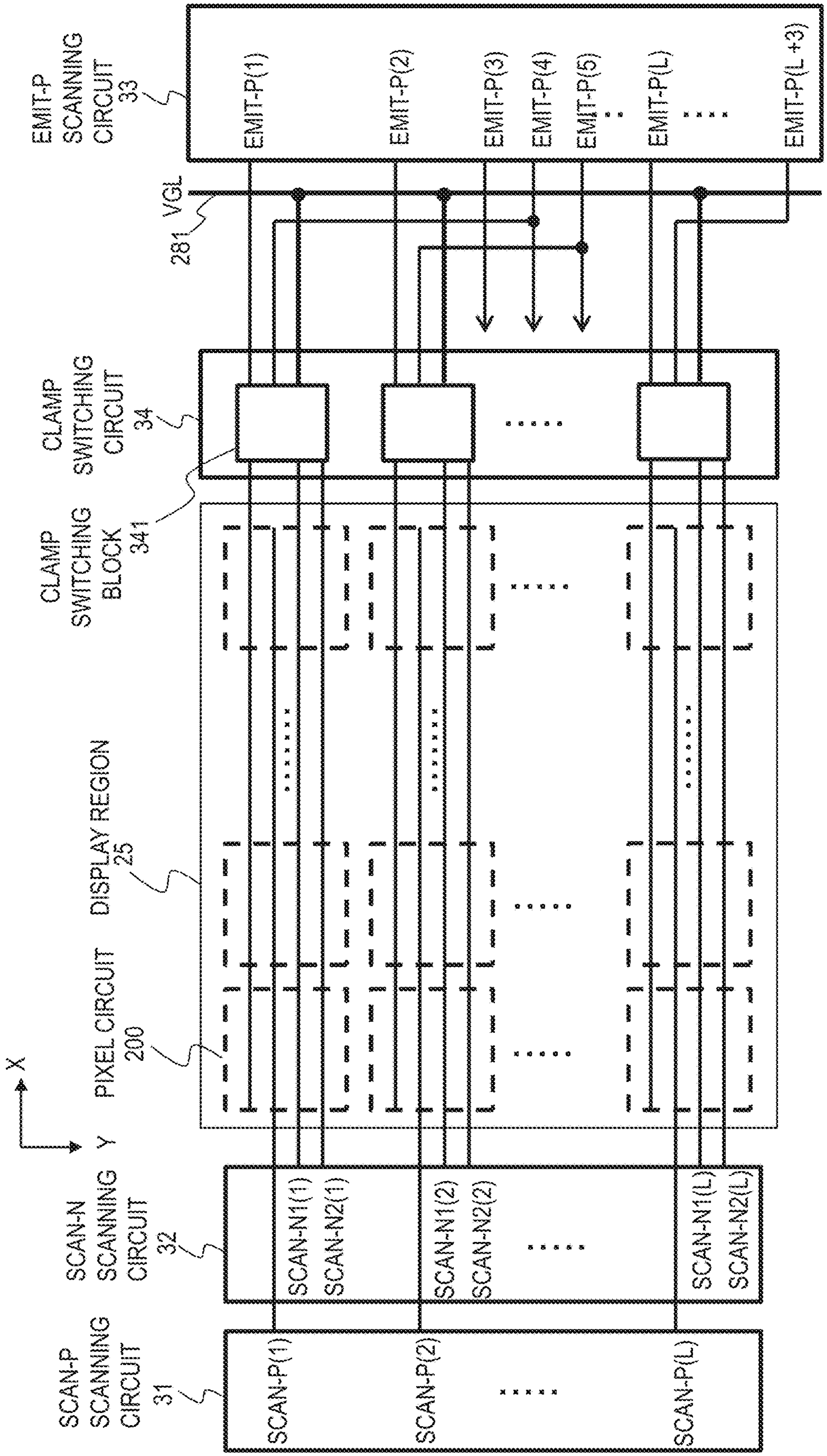
FIG. 5 schematically illustrates an overall configuration of a clamp switching circuit and a relation of the clamp switching circuit with other circuits.

FIG. 5 schematically illustrates an overall configuration of the clamp switching circuit 34 and a relation of the clamp switching circuit 34 with other circuits. The display region 25 includes a plurality of pixel circuits 200. A pixel circuit row is composed of a plurality of pixel circuits 200 aligned in the X-axis direction and a plurality of pixel circuit rows are disposed one above another in the Y-axis direction. In FIG. 5, a pixel circuit is represented by a rectangle surrounded by a dashed line and one of the pixel circuits is provided with a reference sign 200 by way of example. The configuration example of FIG. 5 includes L pixel circuit rows, where L is a positive integer.

On the left outside the display region 25, the SCAN-P scanning circuit 31 and the SCAN-N scanning circuit 32 are disposed. On the right outside the display region 25, the EMIT-P scanning circuit 33 and the clamp switching circuit 34 are disposed. The scanning circuits 31 to 33 and the clamp switching circuit 34 can be laid out differently.

The clamp switching circuit 34 includes a plurality of clamp switching blocks 341. Each clamp switching block 341 is associated with a different pixel circuit row and keeps the potentials of the scanning lines for transmitting the scanning signals SCAN-N1 and SCAN-N2 to the associated pixel circuit row at a low-level potential for a specific period.

Each clamp switching block 341 has a configuration described with reference to FIG. 3A. Each clamp switching block 341 supplies a low-level potential VGL from the VGL power line 281 to the scanning line for transmitting the scanning signals SCAN-N1 and SCAN-N2 for the associated pixel circuit row for a predetermined period (for example, from the time T4 to the time T1 of the next frame), as described with reference to FIG. 4.

In the example described with reference to FIG. 4, the two consecutive scanning signals SCAN-P(K) and SCAN-P(K+1) are shifted by 1H period. The two consecutive scanning signals SCAN-N1(K) and SCAN-N1(K+1) are shifted by 1H period. The two consecutive scanning signals SCAN-N2(K) and SCAN-N2(K+1) are shifted by 1H period, for example. The two consecutive scanning signals EMIT-P(K) and EMIT-P(K+1) are shifted by 1H period.

Figure 6:
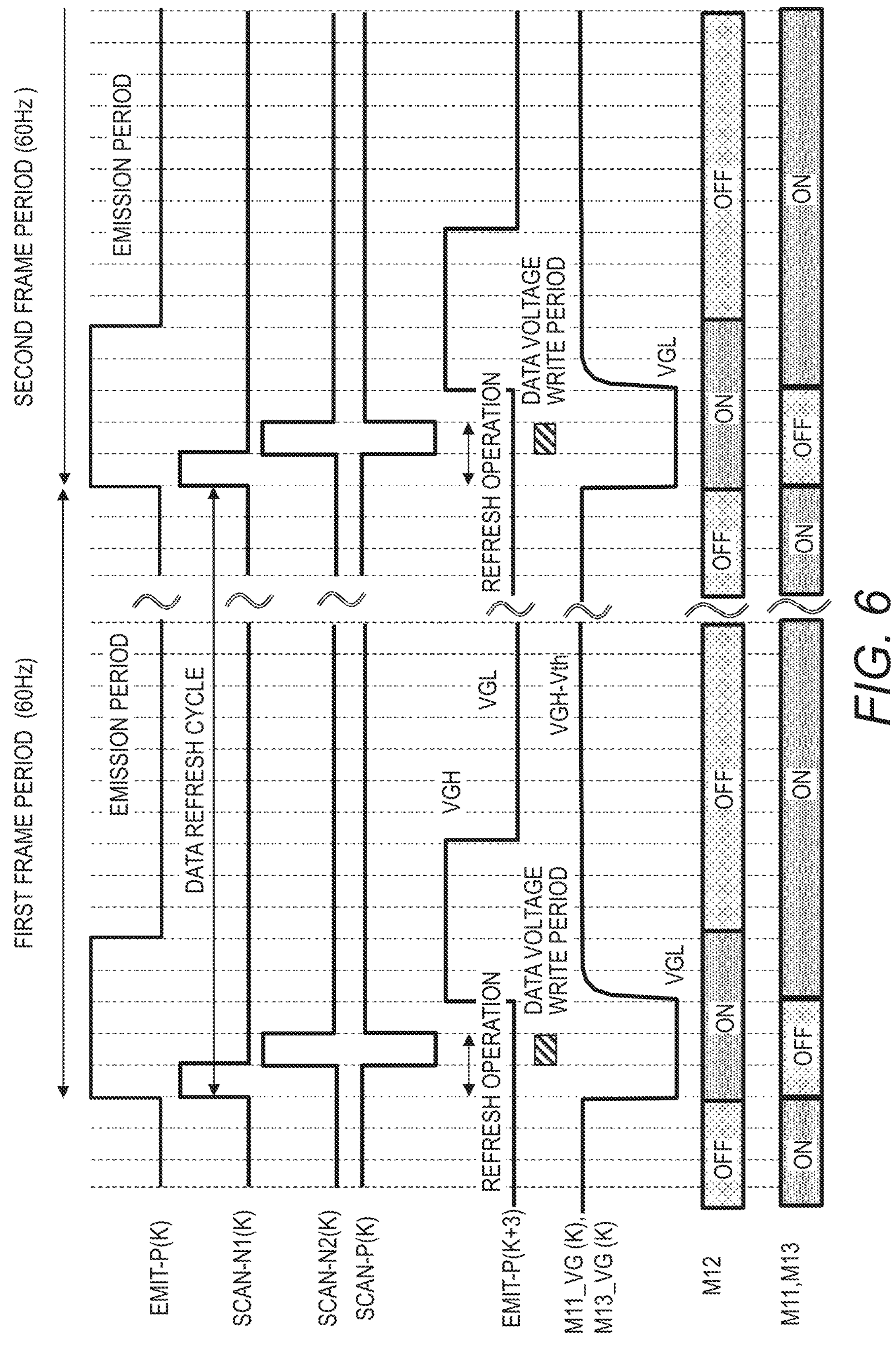
FIG. 6 is a timing chart of the signals for controlling a clamp switching block in two consecutive frames under a normal operation.

The operation of a clamp switching block 341 in successive frame periods is described. FIG. 6 is a timing chart of the signals for controlling a clamp switching block 341 in two consecutive frames under a normal operation. In FIG. 6, the timing chart for the first frame period and the timing chart for the second frame period are identical and they are as described with reference to FIG. 4.

The frame rate is 60 Hz, for example. The frame rate is a frequency to generate frame image data from video data received from the external and it is fixed. The frame image data can be generated by a not-shown control circuit or the driver IC 37.

In a normal operation, the OLED display device 1 determines brightness levels for individual pixel circuits 200 from a set of frame image data and writes data signals corresponding to the frame image to the pixel circuits. The OLED display device 1 rewrites the data voltage held by each pixel circuit 200 at the same frequency as the frame rate. The frequency for the pixel circuit 200 to rewrite the data voltage is referred to as data refresh rate. That is to say, the data refresh rate is equal to the frame rate in the normal operation.

This specification refers to the operation to rewrite the data voltage held in a pixel circuit in a period other than an emission period as refresh operation. The refresh operation includes writing a data voltage to the storage capacitor. The refresh operation can further include a resetting the potentials of specific nodes before writing the data voltage and threshold voltage compensation. In the operation of a pixel circuit described with reference to FIG. 4, the period from the time T1 to the time T3 is the period for the refresh operation.

Figure 7:
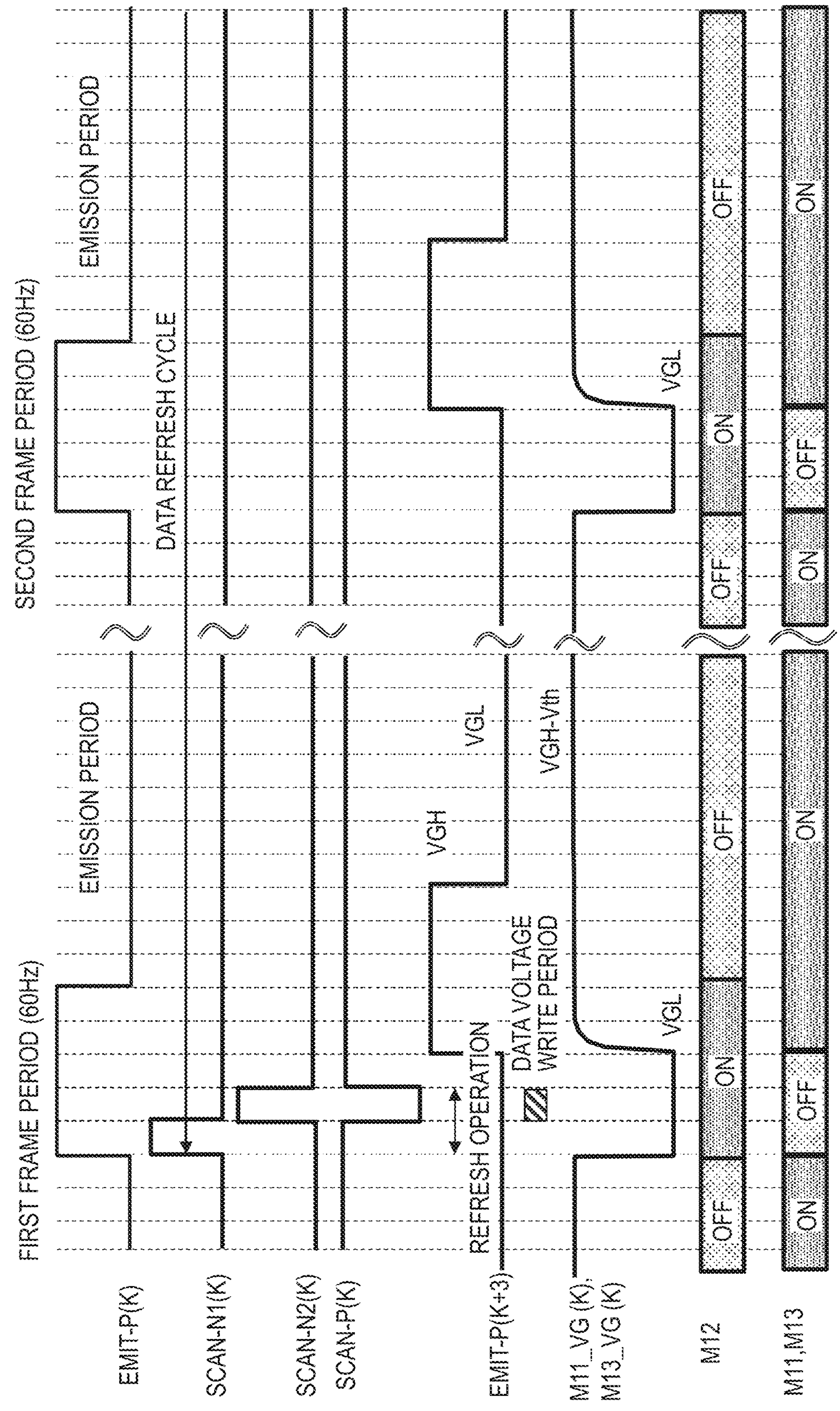
FIG. 7 is a timing chart of the signals for controlling a clamp switching block in two consecutive frames under a low data refresh rate operation.

FIG. 7 is a timing chart of the signals for controlling a clamp switching block 341 in two consecutive frames under a low data refresh rate operation. The timing chart in the first frame period is as described with reference to FIG. 4.

In the second frame period, the scanning signals SCAN-N1(K), SCAN-N2(K), and SCAN-P(K) are fixed to the logical low level and do not change. The potentials of the emission control scanning signals EMIT-P(K) and EMIT-P(K+3) change in the same manner as the first frame period. This means that both of the first frame period and the second frame period include an emission period having the same length. A new data signal (data voltage) is written to the pixel circuit 200 in the first frame period but no new data signal is written in the second frame period, so that the OLED element E1 in the pixel circuit 200 lights at the same brightness as the first frame period.

The frequency of the EMIT-P signal is not lowered even in the low data refresh rate operation. This configuration suppresses the generation of flickers. The frequency of the EMIT-P signal is fixed at the same frequency (60 Hz) as the frame rate; the SCAN-N1 and SCAN-N2 signal lines are clamped at the low-level potential at the frame rate. As a result, the low-level potential in the low frame-rate operation can be prevented from varying.

The description provided with reference to FIGS. 6 and 7 is also applicable to a display device including a clamp switching block having another configuration like the clamp switching block 345 or 347 that will be described later.

Figure 8:
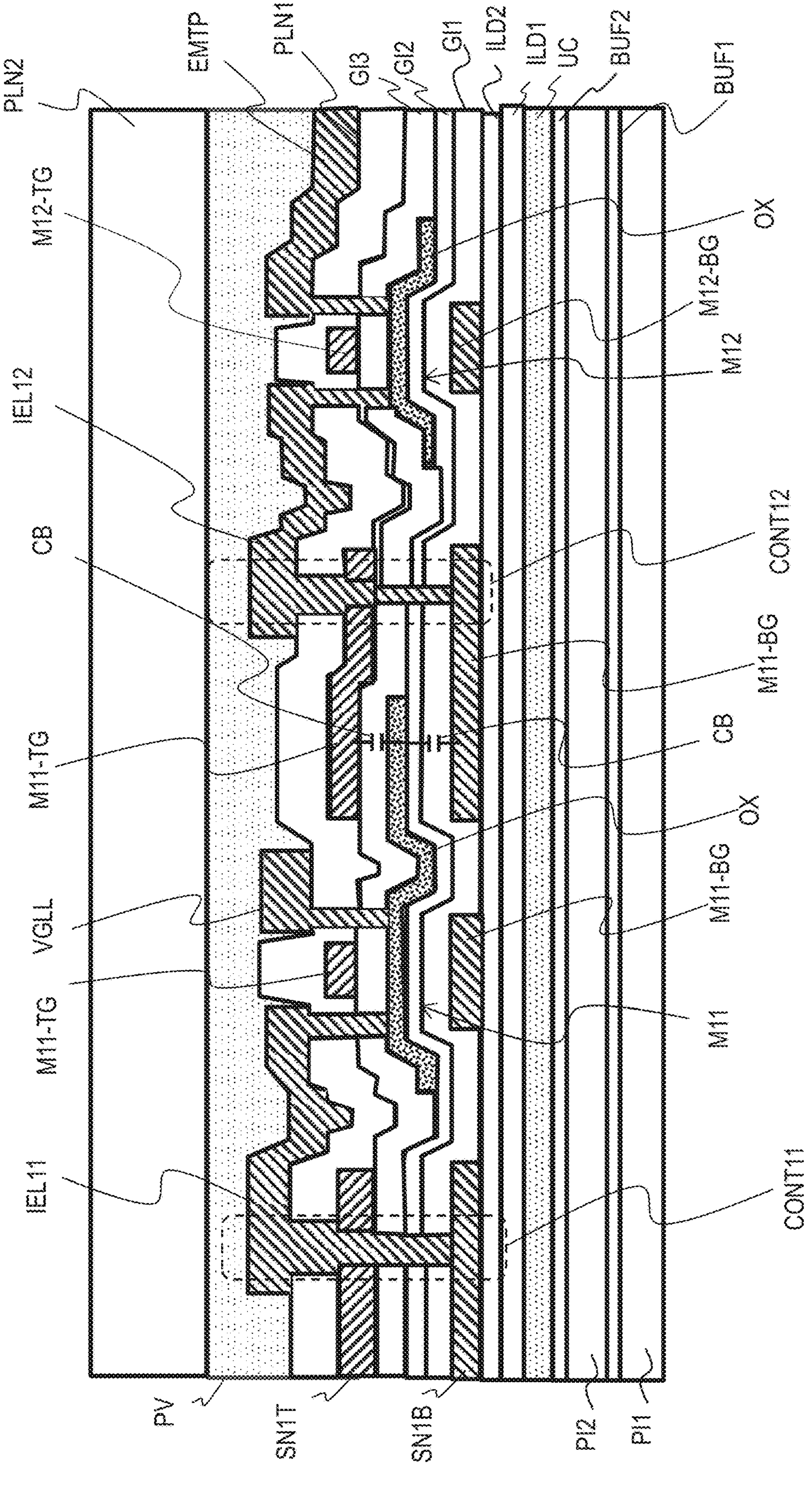
FIG. 8 is a cross-sectional diagram schematically illustrating a cross-sectional structure of a part of a clamp switching block.

FIG. 8 is a cross-sectional diagram schematically illustrating a cross-sectional structure of a part of a clamp switching block 341. A polyimide layer PI1, a buffer layer BUF1, and another polyimide layer PI2 laid one above another constitute a flexible insulating substrate. A buffer layer BUF2, an undercoat insulating layer UC, and interlayer insulating layers ILD1 and ILD2 are layered above the polyimide layer PI2. These are made of organic or inorganic insulating materials.

A first metal layer is provided above the interlayer insulating layer ILD2. The first metal layer includes bottom-gate electrodes M11-BG and M12-BG of the switching transistors M11 and M12 and a lower line SN1B, which is a part of the signal line for transmitting the scanning signal SCAN-N1.

Gate insulating layers GI1 and GI2 are layered to cover the first metal layer. An oxide semiconductor layer OX is provided above the gate insulating layer GI1. Parts of the oxide semiconductor layer OX correspond to the channel regions of the switching transistors M11 and M12. Parts of the oxide semiconductor layer OX that are reduced in resistance correspond to source/drain regions of the switching transistors M11 and M12.

A gate insulating layer GI3 is provided to cover the oxide semiconductor layer OX. A second metal layer is provided above the gate insulating layer GI3. The second metal layer includes top-gate electrodes M11-TG and M12-TG of the switching transistors M11 and M12 and an upper line SN1T, which is another part of the signal line for transmitting the scanning signal SCAN-N1. A part of a capacitive element CB is configured between the bottom-gate electrode M11-BG and the source region of the transistor M11. Another part of the capacitive element CB is configured between the top-gate electrode M11-TG and the source region of the transistor M11. This structure is effective to reduce the area of the capacitive element. The dual-gate structure having the top-gate and the bottom-gate is effective to shield the undesirable electro-static field caused by the fixed charges in the polyimide layer PL1, thereby improving stability of the transistors.

A planarization layer PLN1 having insulating properties is provided to cover the second metal layer. A third metal layer is provided above the planarization layer PLN1. The third metal layer includes a power line VGLL for the low-level potential VGL and a signal line EMTP for transmitting the emission control scanning signal EMIT-P. The third metal layer further includes an electrode IEL11 that interconnects the drain of the transistor M11 and the signal lines SN1T and SN1B for transmitting the scanning signal SCAN-N1 and an electrode IEL12 that interconnects a source/drain of the transistor M12 and the gates M11-TG and M11-BG of the transistor M11. The top gate M11-TG and the bottom-gate M11-BG are connected through single contact hole CONT12. Also, the signal lines SN1T and SN1B are connected through single contact hole CONT11. Such contact structure is effective for reducing the contact area.

A passivation layer PV having insulating properties is provided to cover the third metal layer and further, a planarization layer PLN2 having insulating properties is provided above the passivation layer PV.

Figure 9:
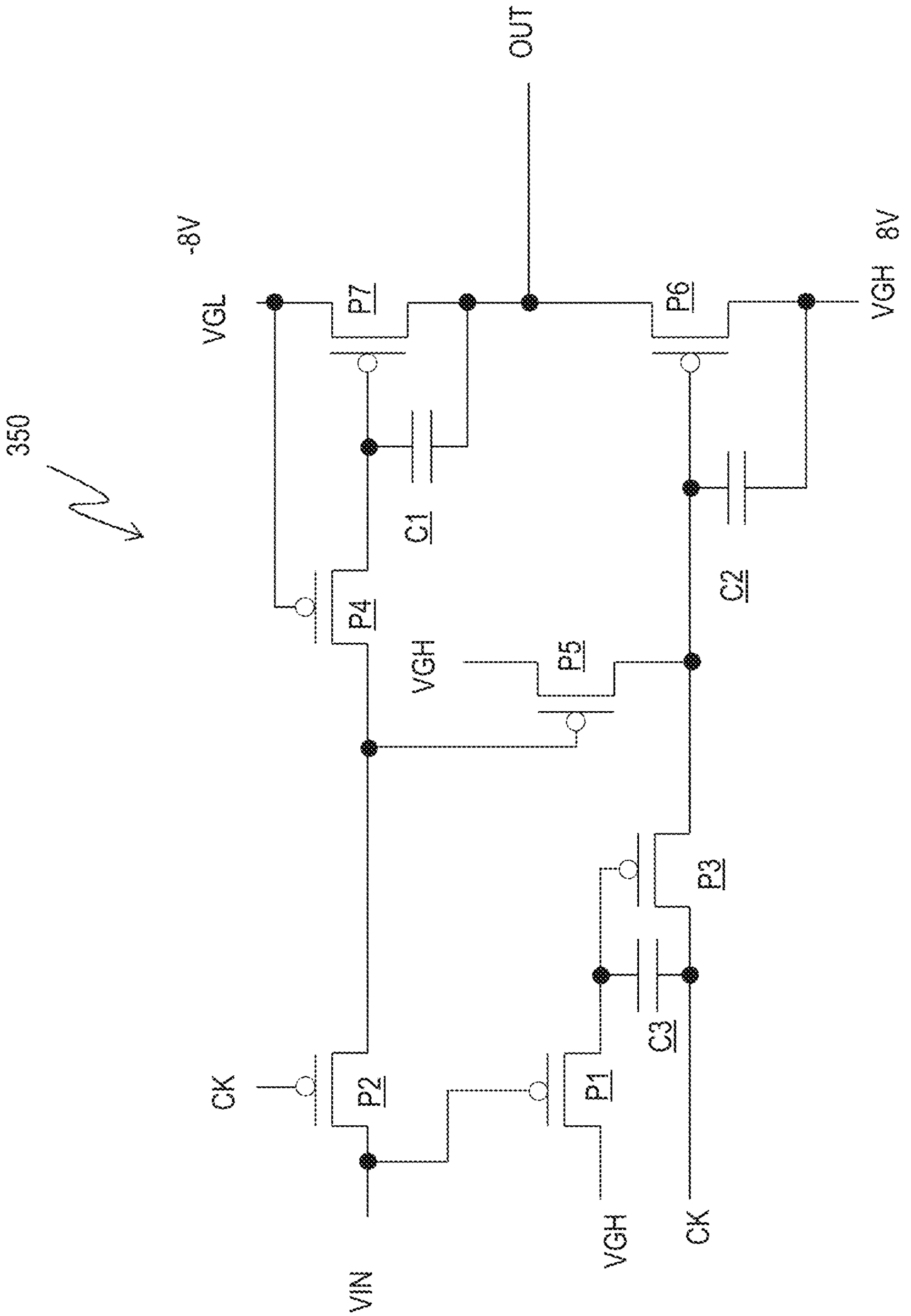
FIG. 9 illustrates a configuration example of a shift register block.

FIG. 9 illustrates a configuration example of a shift register block 350 for generating SCAN-N1 and SCAN-N2 signals. A shift register circuit can be configured by connecting a plurality of shift register blocks 350. The shift register block 350 can be incorporated in the scanning circuits 31 to 33. All the transistors in the shift register block 350 in FIG. 9 are p-type TFTs to attain a compact circuit.

The shift register block 350 includes p-type switching transistors P1 to P7 and capacitive elements C1 to C3. The output signal VIN from the previous stage, a low-level potential VGL, a high-level potential VGH, and a clock signal CK are input to the shift register block 350. The shift register block 350 outputs an output signal OUT in response to the input signals and power supply potentials. In the example of FIG. 9, the low-level potential VGL is −8 V and the high-level potential VGH is 8 V. The output stage includes two transistors P6 and P7; the capacitive element C2 holds the gate-source voltage of the transistor P6 and the capacitive element C1 holds the gate-source voltage of the transistor P7.

Another Configuration Example of Pixel Circuit

Figure 10:
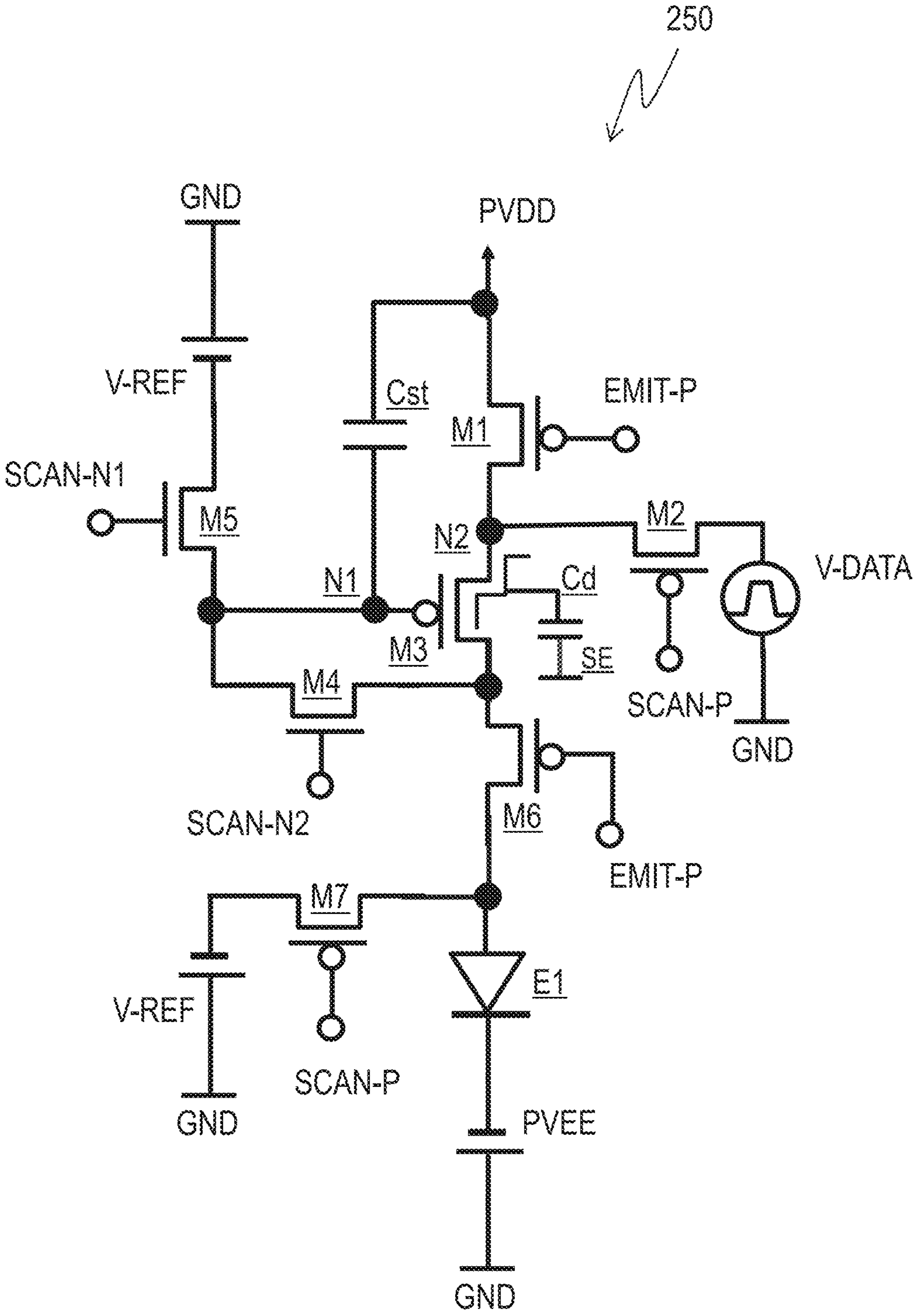
FIG. 10 illustrates another example of a pixel circuit.

Another example of a pixel circuit and an example of the device structure for the pixel circuit are described. FIG. 10 illustrates an example of a pixel circuit 250. The pixel circuit 250 includes a shield electrode SE and a capacitive element Cd in addition to the components of the pixel circuit 200 illustrated in FIG. 3A. The operation of the pixel circuit 250 in response to the signals is the same as the operation of the pixel circuit 200.

Figure 11:
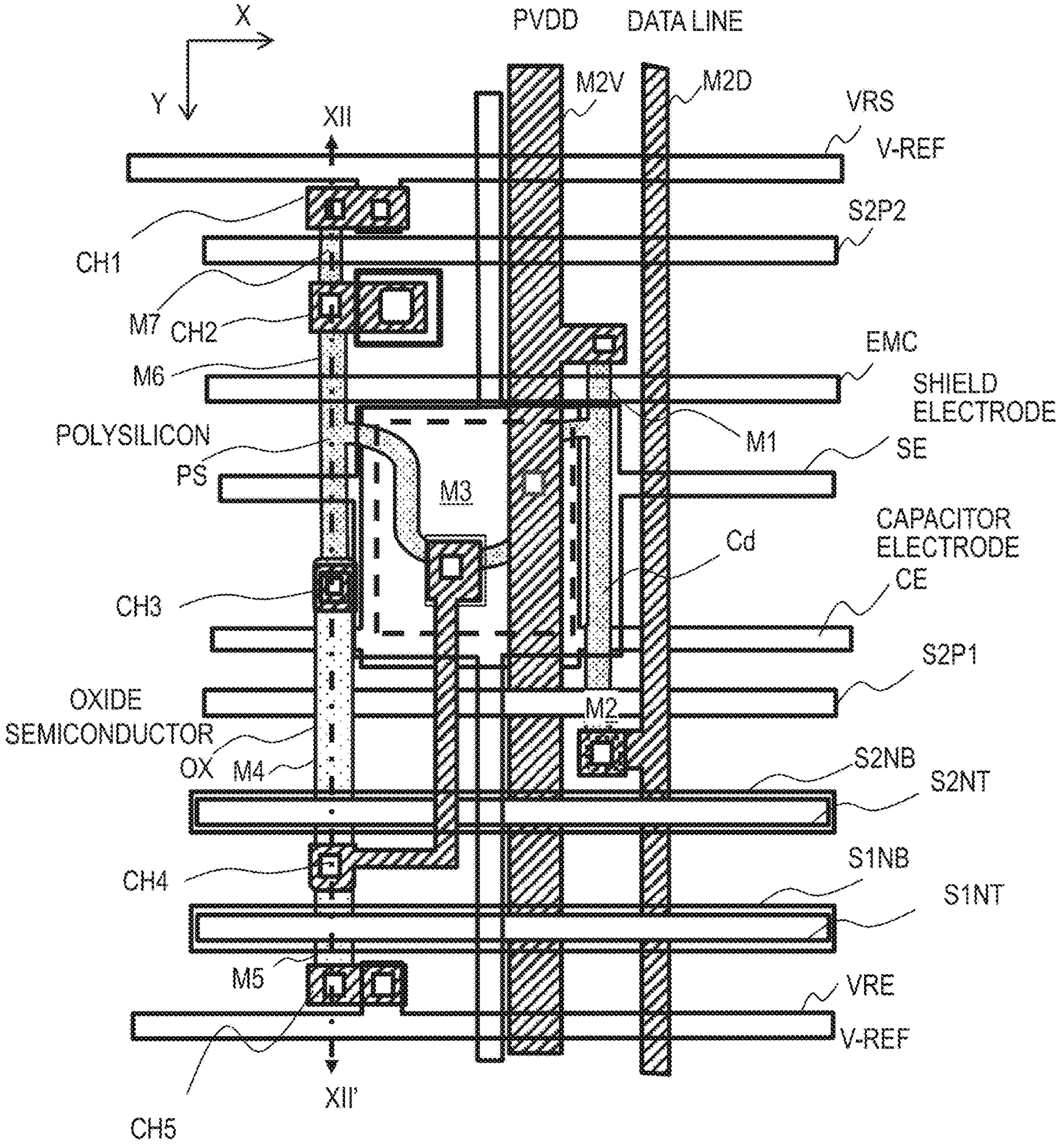
FIG. 11 schematically illustrates a planar structure of the pixel circuit in FIG. 10.
Figure 12:
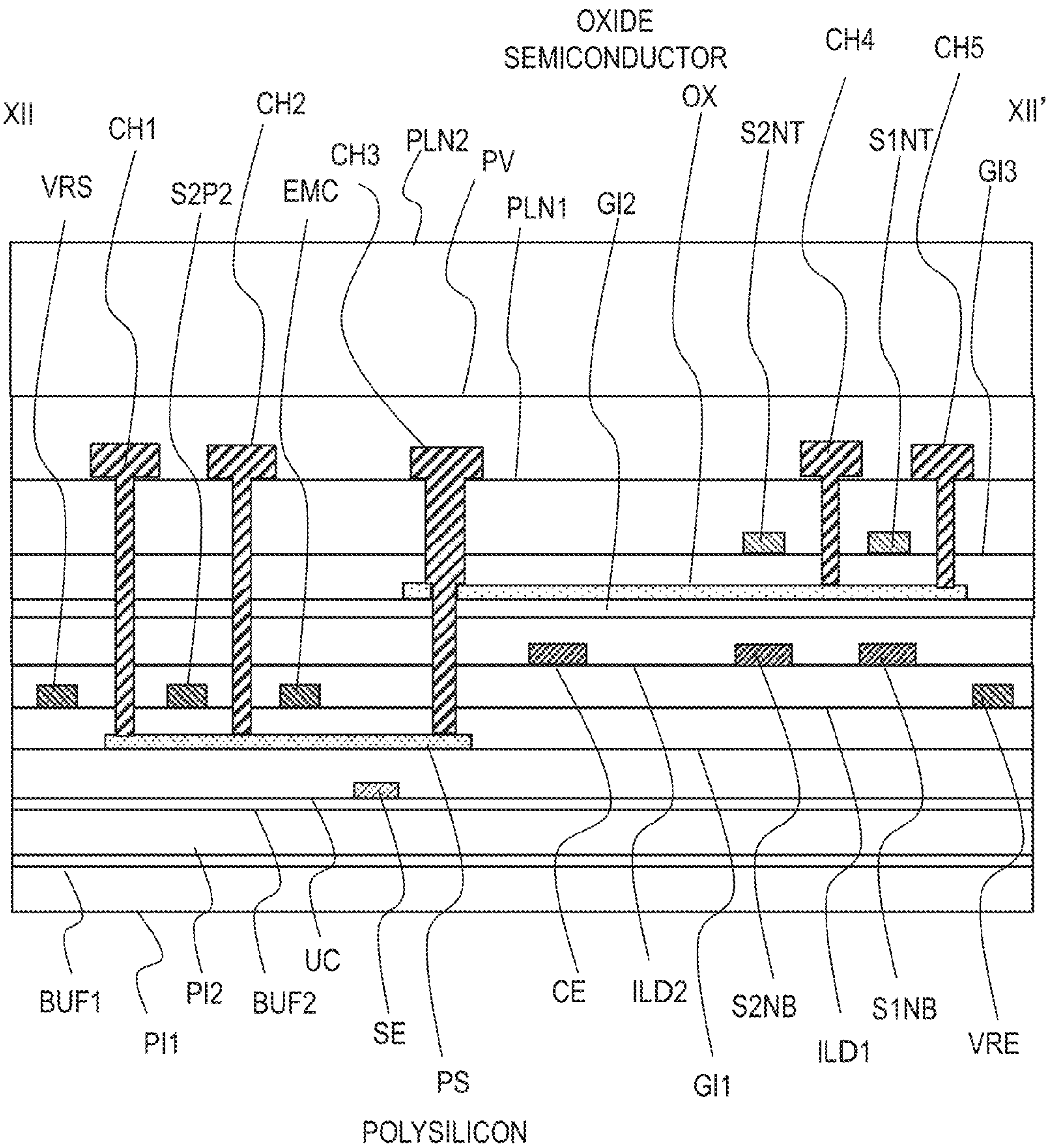
FIG. 12 schematically illustrates the cross-sectional structure along the section line XII-VII' in FIG. 11.

FIG. 11 schematically illustrates a planar structure of the pixel circuit in FIG. 10 and FIG. 12 schematically illustrates the cross-sectional structure along the section line XII-XII' in FIG. 11. In FIG. 11, the line M2D is the data line and the line M2V transmits the power supply potential PVDD. The line VRE transmits the reference potential V-REF.

The gate line S2P2 transmits the gate signal for the transistor M7. The line EMC transmits the control signal EMIT-P for the gates of the transistors M1 and M6. The shield electrode SE includes one of the electrodes of the capacitive element Cd and the capacitor electrode CE includes one of the electrodes of the storage capacitive element Cst.

The gate line S2P1 transmits the gate signal for the transistor M2. The gate line S2NB transmits the gate signal for the bottom-gate electrode of the transistor M4 and the gate line S2NT transmits the gate signal for the top-gate electrode of the transistor M4. The gate line S1NB transmits the gate signal for the bottom-gate electrode of the transistor M5 and the gate line S1NT transmits the gate signal for the top-gate electrode of the transistor M5.

The contact hole CH1 interconnects a source/drain region of the transistor M7 and the line VRS. The contact hole CH2 interconnects the other source/drain region of the transistor M7 and the anode electrode of the OLED element E1. The contact hole CH3 interconnects a source/drain region of the transistor M4 and a source/drain region of the transistor M3 or M6. The semiconductor layer of the transistor M4 is the oxide semiconductor layer OX and the semiconductor layers of the transistors M3 and M6 are the low-temperature polysilicon layer PS. The contact hole CH3 interconnects the oxide semiconductor layer and the low-temperature polysilicon layer.

The contact hole CH4 interconnects the other source/drain region of the transistor M4 and a source/drain line, which is connected to the gate electrode of the transistor M3. The contact hole CH5 interconnects a source/drain region of the transistor M5 and the line VRE.

FIG. 12 schematically illustrates the cross-sectional structure along the section line XII-XII' in FIG. 11. A polyimide layer PI1, a buffer layer BUF1, and another polyimide layer PI2 layered one above another constitute a flexible insulating substrate. The shield electrode SE is laid above a buffer layer BUF2. An undercoat insulating layer UC is laid to cover the shield electrode SE.

The low-temperature polysilicon layer PS is laid above the undercoat insulating layer UC and a gate insulating layer GI1 is laid to cover the low-temperature polysilicon layer PS. The polysilicon layer PS is disposed over the shield electrode SE. The overlapped area of polysilicon layer PS and the shield electrode SE from a capacitive element Cd. The shield electrode SE effectively shield the transistor M3 from the undesirable electro-static field caused by the fix charge in the polyimide layers PI1 and PI2.

The lines VRS, S2P2, EMC, and VRE are provided above the gate insulating layer GI1. These lines are made of the same metal layer. An interlayer insulating layer ILD1 is laid to cover the lines VRS, S2P2, EMC, and VRE.

The capacitor electrode CE and the lines S2NB and S1NB are laid above the interlayer insulating layer ILD1. These lines are made of the same metal layer. Another interlayer insulating layer ILD2 is laid to cover the capacitor electrode CE and the lines S2NB and S1NB. A gate insulating layer GI2 is laid above the interlayer insulating layer ILD2.

The oxide semiconductor layer OX is laid above the gate insulating layer GI2. Another gate insulating layer GI3 is laid to cover the oxide semiconductor layer OX. The lines S2NT and S1NT are laid above the gate insulating layer GI3. A planarization layer PLN1 is laid to cover the lines S2NT and S1NT.

The contact holes CH1 and CH2 extend through the insulating layers PLN1, GI3, GI2, ILD2, ILD1, and GI1 and are in contact with the low-temperature polysilicon layer PS (low-resistive regions thereof). The contact hole CH3 extends through the insulating layers PLN1 and GI3 and is in contact with the top face of the oxide semiconductor layer OX. The contact hole CH3 further extends through the oxide semiconductor layer OX and is in contact with the end face of the oxide semiconductor layer OX defining the hole. The contact hole CH3 further extends through the insulating layers GI2, ILD2, ILD1, and GI1 and is in contact with the low-temperature polysilicon layer PS (a low-resistive region thereof). This structure is effective for reducing the area for contacting the semiconductor layer OX and the low-temperature polysilicon layer PS.

The contact holes CH4 and CH5 extend through the insulating layers PLN1 and GI3 and are in contact with the top face of the oxide semiconductor layer OX. A passivation layer PV is laid to cover the contact holes CH1 to CH5 and further, a planarization layer PLN2 is laid above the passivation layer PV.

Another Configuration Example of Clamp Switching Block

Figure 13:
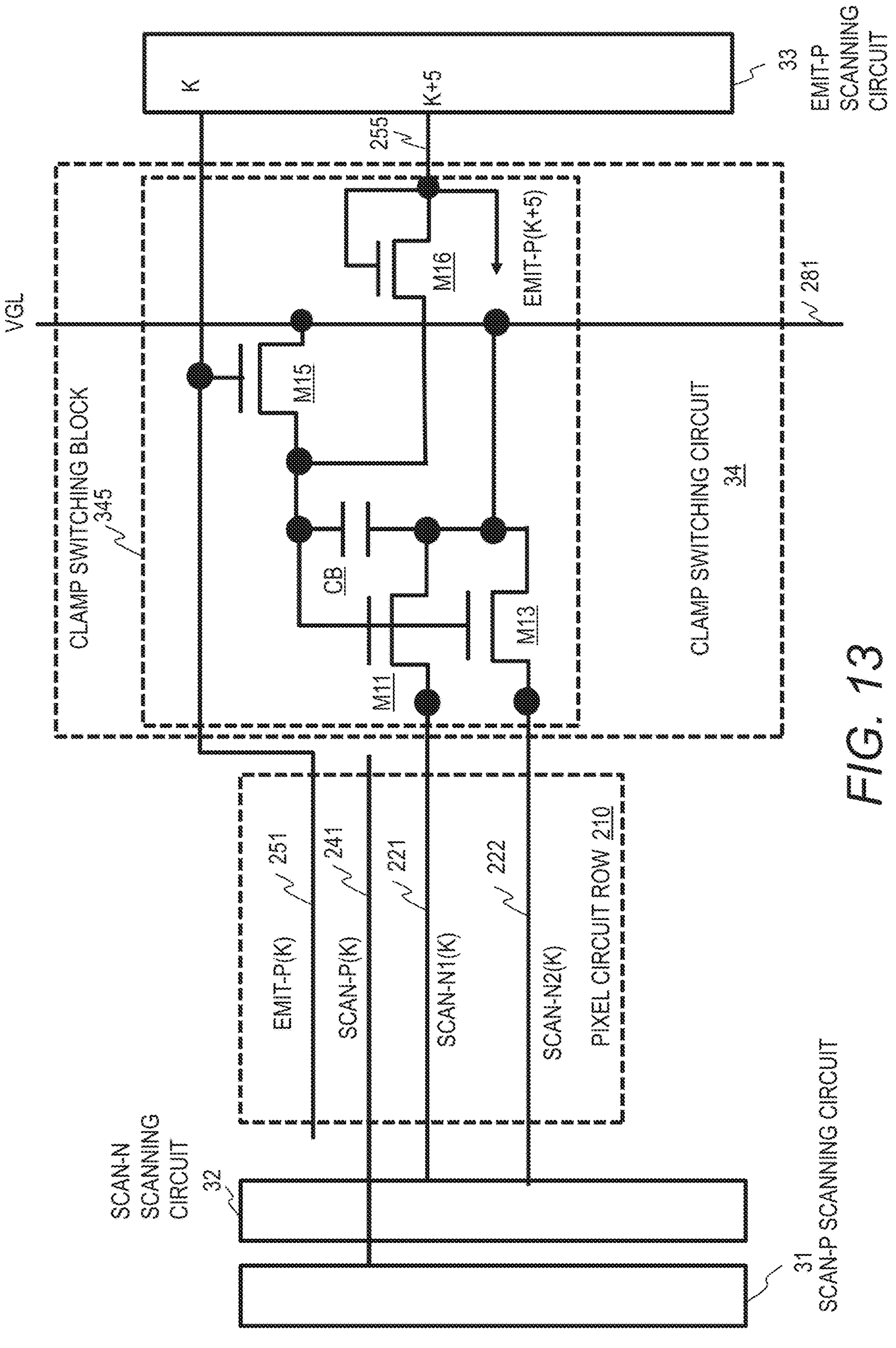
FIG. 13 illustrates another configuration example of a clamp switching block included in a clamp switching circuit.

Another configuration example of a clamp switching block is described. FIG. 13 illustrates a configuration example of a clamp switching block 345 included in a clamp switching circuit 34. Differences from the clamp switching block 341 described with reference to FIGS. 3A and 4 are mainly described. The pixel circuits can have the configuration described with reference to FIG. 2 or 10.

The clamp switching block 345 includes a switching transistor M15 of an n-type TFT in place of the switching transistor M12 in the clamp switching block 341 and further, a transistor M16 of an n-type TFT.

The switching transistor M15 is an example of a second n-type switching transistor. The gate of the transistor M15 is connected to the emission control scanning signal line 251 for transmitting the emission control scanning signal EMIT-P(K) and controlled to be ON/OFF by the emission control scanning signal EMIT-P(K). The source of the transistor M15 is connected to the VGL power line 281 and the drain is connected to the gates of the clamp switching transistors M11 and M13. When the transistor M15 is ON, the gates of the clamp switching transistors M11 and M13 are connected to the VGL power line 281.

The transistor M16 is diode-connected. That is to say, its drain and gate are connected and electrically continuous. The source of the transistor M16 is connected to the drain of the transistor M15 and the drain of the transistor M16 is connected to the signal line 255 for transmitting the emission control scanning signal EMIT-P(K+5).

Figure 14:
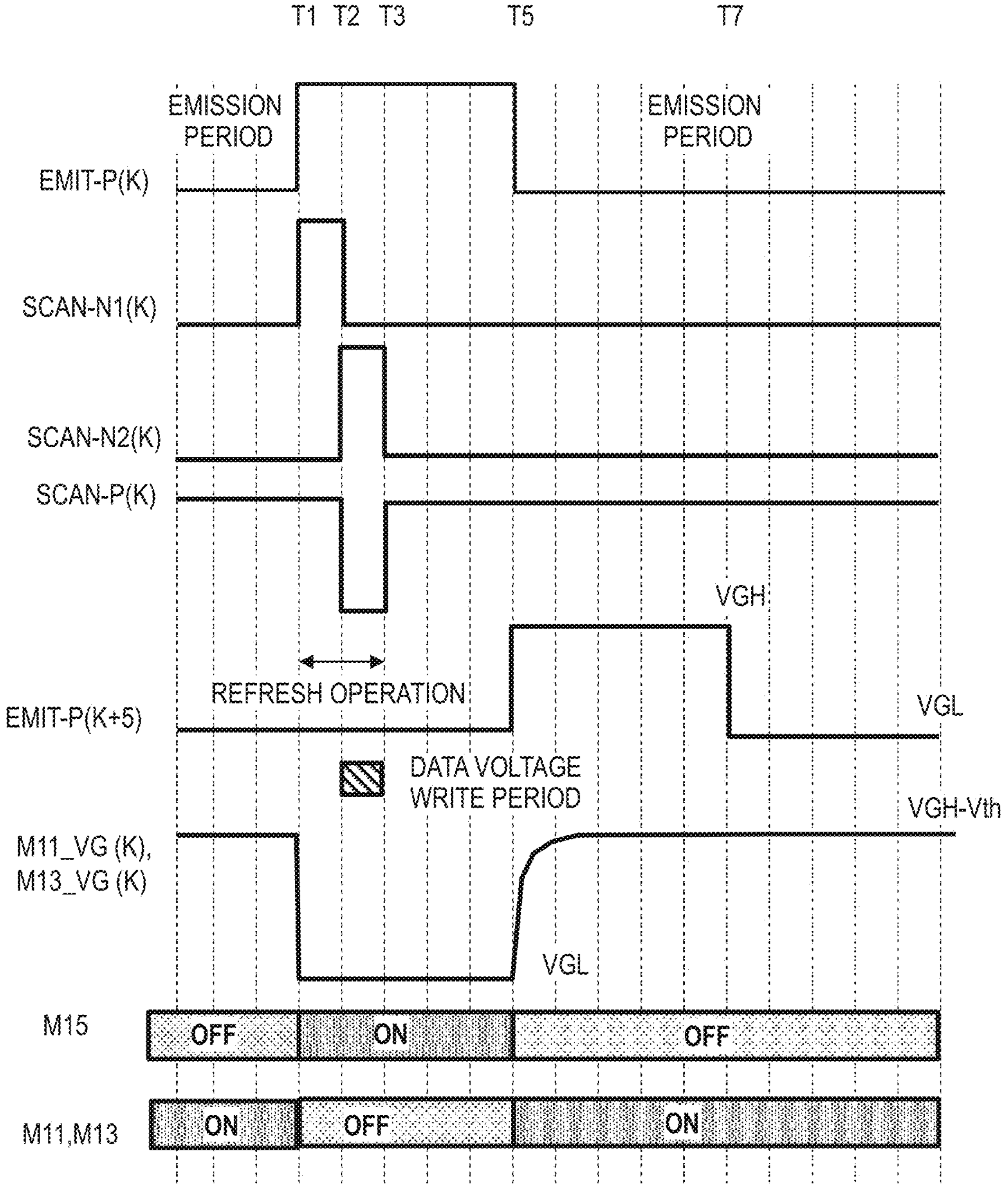
FIG. 14 is a timing chart of the signals for controlling the clamp switching block in FIG. 13.

FIG. 14 is a timing chart of the signals for controlling the clamp switching block 345 in FIG. 13. The times T1 to T3 and T5 in the following description are the same as the time T1 to T3 and T5 in FIG. 4. The period prior to the time T1 is an emission period. The operation of the pixel circuit 200 or 250 are as described with reference to FIG. 4 and the repetitive description is omitted here.

At the time T1, the emission control scanning signal EMIT-P(K) changes from a low-level potential to a high-level potential. The scanning signal SCAN-N1(K) changes from a low-level potential to a high-level potential.

In response to the change of the emission control scanning signal EMIT-P(K), the switching transistor M15 in the clamp switching block 345 turns from OFF to ON. In response to the switching transistor turning ON, the gate potentials (M11_VG(K), M13_VG(K)) of the clamp switching transistors M11 and M13 change from (VGH−Vth) to VGL, where Vth represents the threshold voltage of the transistor M16. As a result, the clamp switching transistors M11 and M13 turn from ON to OFF.

At a subsequent time T2, the scanning signal SCAN-N1(K) changes from the high-level potential to the low-level potential. The scanning signal SCAN-N2(K) changes from a low-level potential to a high-level potential. The scanning signal SCAN-P(K) changes from a high-level potential to a low-level potential. The emission control scanning signal EMIT-P(K) remains at the high-level potential. Accordingly, the states of the transistors M11, M13, and M15 do not change. The emission control scanning signal EMIT-P(K+5) remains at the low-level potential.

At a subsequent time T3, the scanning signal SCAN-N2(K) changes from the high-level potential to the low-level potential. The scanning signal SCAN-P(K) changes from the low-level potential to the high-level potential. The emission control scanning signal EMIT-P(K) remains at the high-level potential and the emission control scanning signal EMIT-P(K+5) remains at the low-level potential. The states of the transistors M11, M13, and M15 do not change. During the period from the time T2 to the time T3, a data voltage is written to the storage capacitive element Cst in the pixel circuit 200 or 250.

At a subsequent time T5, the emission control scanning signal EMIT-P(K) changes from the high-level potential to the low-level potential. The emission control scanning signal EMIT-P(K+5) changes from the low-level potential to the high-level potential. In response to the emission control scanning signal EMIT-P(K), the switching transistor M15 turns from ON to OFF.

In response to the emission control scanning signal EMIT-P(K+5), a voltage (VGH−Vth−VGL) is stored between the terminals of the capacitive element CB. The gate-source voltages (M11_VG(K), M13_VG(K)) of the clamp switching transistors M11 and M13 change from VGL to (VGH−Vth). The clamp switching transistors M11 and M13 turn from OFF to ON.

As a result, the SCAN-N1(K) scanning line 221 and the SCAN-N2(K) scanning line 222 are connected to the VGL power line 281 via the clamp switching transistors M11 and M13 being ON and supplied with the low-level potential VGL. Hence, the potentials of the SCAN-N1(K) scanning line 221 and the SCAN-N2(K) scanning line 222 do not elevate, preventing a malfunction of the pixel circuit 200 or 250.

At a subsequent time T7, the emission control scanning signal EMIT-P(K+5) changes from the high-level potential to the low-level potential. The other signals do not change. The clamp switching transistors M11 and M13 are maintained to be ON because of the voltage held in the capacitive element CB. From the time T7 to the beginning of the next frame, all signals keep their states without change. The period from the time T5 to the time T7 has a length of 5H.

During the period from the time T1 to the time T3 in which at least either the scanning signal SCAN-N1(K) or SCAN-N2(K) is at a physical high-level potential (a logical high level), the clamp switching transistors M11 and M13 are maintained to be OFF. This operation eliminates interference with appropriate writing of data signal to the pixel 200 or 250.

In the example described with reference to FIG. 14, the clamp switching transistors M11 and M13 are maintained to be ON from the time T5 to the time T1 of the next frame. That is to say, the scanning lines 221 and 222 for the scanning signals SCAN-N1(K) and SCAN-N2(K) are connected to the VGL power line 281 and supplied with the low-level potential VGL from the VGL power line 281. This operation effectively prevents the low-level potentials of the scanning lines 221 and 222 from drifting to cause leakage of current from the n-type TFTs in the pixel circuit 200 or 250.

The example described with reference to FIG. 14 controls the clamp switching block 345 for the K-th pixel circuit row with the emission control scanning signals EMIT-P(K) and EMIT-P(K+5). In order to keep the clamp switching transistors M11 and M13 OFF during the period from the time T1 to the time T3, the emission control scanning signal EMIT-P for a different pixel circuit row can be used.

For example, an emission control scanning signal EMIT-P that turns on the clamp switching transistors M11 and M13 at a time not earlier than the time T5 can be used. The EMIT-P signal can be an emission control scanning signal EMIT-P(K+m) for a given pixel circuit row later than the emission control scanning signal EMIT-P(K+4), where m is an integer greater than 4. From the viewpoint to prevent a malfunction, m can be an integer greater than 5. Taking a smaller value for m enables the clamp switching transistors M11 and M13 to be ON for a longer time. In place of the emission control scanning signal EMIT-P(K), an emission control scanning signal EMIT-P preceding the emission control scanning signal EMIT-P(K) can be used.

Other Configuration Examples of Pixel Circuit and Clamp Switching Circuit

Figure 15:
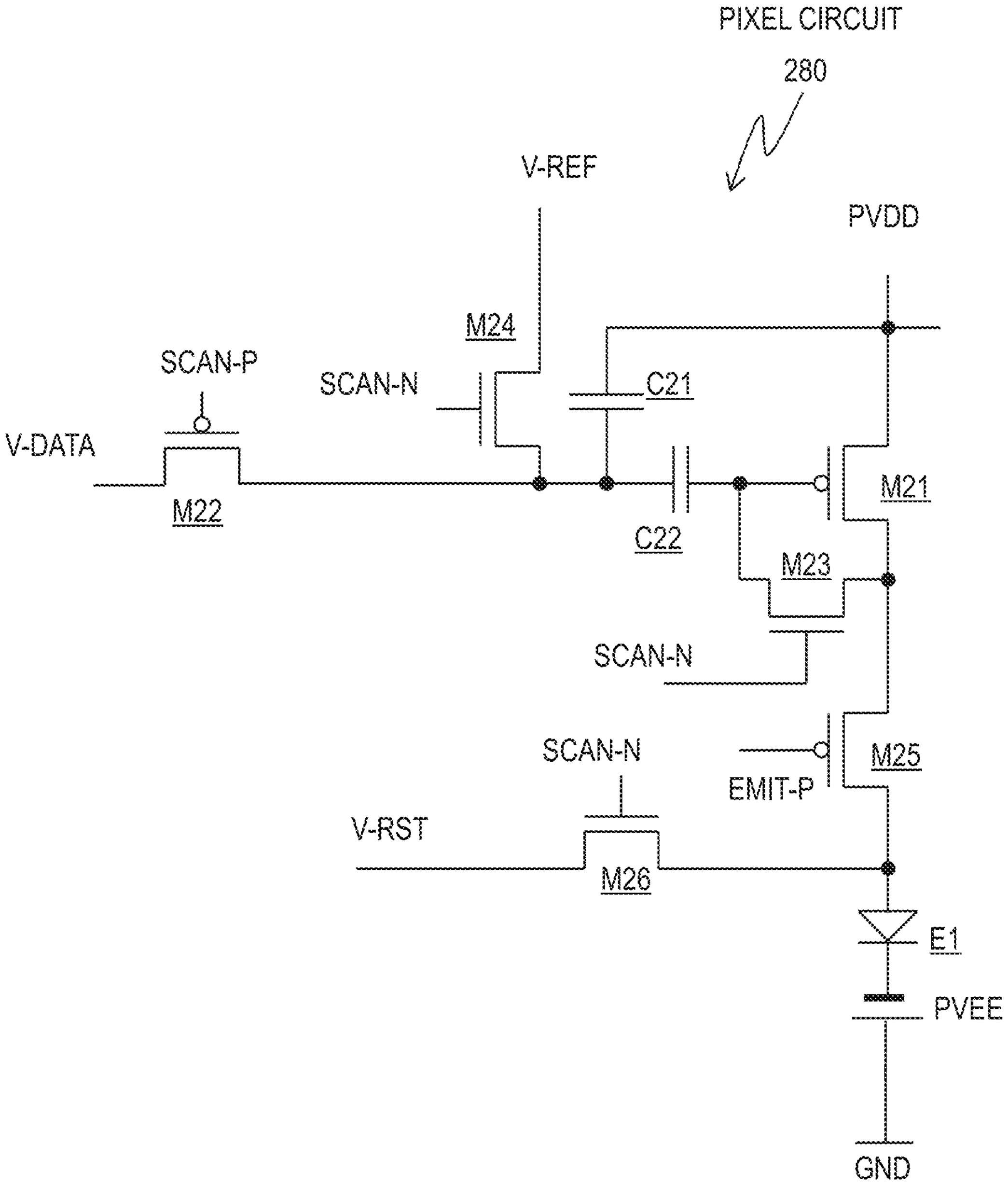
FIG. 15 illustrates an example of a pixel circuit.

FIG. 15 illustrates a configuration example of a pixel circuit 280 in an embodiment of this specification. The pixel circuit 280 includes transistors (TFTs) M21 to M26. The transistors M23, M24, and M26 are n-type TFTs and the other transistors are p-type TFTs. The n-type TFTs can be oxide semiconductor TFTs and the p-type TFTs can be low-temperature polysilicon TFTs. At least one of the transistors can be of the other conductive type.

The transistor M21 is a driving transistor for controlling the amount of electric current to an OLED element E1. The source of the driving transistor M21 is connected to a power line for transmitting a positive power supply potential PVDD. The driving transistor M21 controls the amount of electric current to be supplied from the power line to the OLED element E1 in accordance with the voltage stored in storage capacitive elements C21 and C22 connected in series. The storage capacitive elements C21 and C22 hold the written voltage throughout the period of one refresh period. The cathode of the OLED element E1 is supplied with a negative power supply potential PVEE.

The capacitive elements C21 and C22 are connected in series between the power line for transmitting the power supply potential PVDD and the gate of the driving transistor M21. A source/drain of the transistor M24 and a source/drain of the transistor M22 are connected to an intermediate node between the capacitive elements C21 and C22. The composite capacitor of the series storage capacitive elements C21 and C22 stores the voltage between the gate and the source of the driving transistor M21. The source potential of the driving transistor M21 is PVDD.

The transistor M25 is an emission control switching transistor for controlling ON/OFF of supply of lighting current to the OLED element E1 and the resulting light emission of the OLED element E1. The source of the transistor M25 is connected to the drain of the driving transistor M21. The gate of the transistor M25 is connected to the signal line for transmitting an emission control scanning signal EMIT-P and the transistor M25 is controlled by the emission control scanning signal EMIT-P from the EMIT-P scanning circuit 33.

The transistor M26 works to supply a reset potential V-RST to the anode of the OLED element E1. One of the source/drain regions of the transistor M26 is connected to a power line for transmitting the reset potential V-RST and the other source/drain region is connected to the anode of the OLED element E1. The reset potential V-RST can be equal to the cathode power supply potential PVEE.

The gate of the transistor M26 is controlled by the scanning signal SCAN-N. When the transistor M26 is turned ON by the scanning signal SCAN-N from the SCAN-N scanning circuit 32, the transistor M26 supplies the reset potential V-RST transmitted by the power line to the anode of the OLED element E1.

The transistor M23 is a switching transistor for writing a voltage for applying threshold compensation to the driving transistor M21 to the storage capacitive elements C21 and C22 and is a transistor for resetting the gate potential of the driving transistor M21. The source and the drain of the transistor M23 connect the gate and the drain of the driving transistor M21. Accordingly, when the transistor M23 is ON, the driving transistor M21 is diode connected.

The transistor M24 is used to write a voltage for applying threshold compensation to the driving transistor M21 to the storage capacitive elements C21 and C22. The transistor M24 controls whether to supply a reference potential V-REF to the storage capacitive elements C21 and C22. The reference potential V-REF can be equal to the positive power supply potential PVDD. One of the source/drain regions of the transistor M24 is connected to a power line for transmitting the reference potential V-REF and the other source/drain region is connected to an intermediate node between the capacitive elements C21 and C22. The gate of the transistor M24 is controlled by the scanning signal SCAN-N from the SCAN-N scanning circuit 32.

The transistors M23 and M24 are controlled by the scanning signal SCAN-N. In the period where these transistors are ON and further, the transistor M25 is ON, the gate potential of the driving transistor M21 is reset. Subsequently, the transistor M25 is turned OFF. In this state, a threshold compensation voltage is written to the storage capacitive elements C21 and C22.

The transistor M22 is a switching transistor for selecting a pixel circuit to be supplied with a data signal (data voltage) and writing the data signal V-DATA to the storage capacitive elements C21 and C22. One of the source/drain regions of the transistor M22 is connected to the storage capacitive elements C21 and C22 and the other source/drain region is connected to a data line for transmitting the data signal V-DATA. The gate of the transistor M22 is controlled by the scanning signal SCAN-P from the SCAN-P scanning circuit 31.

Figure 16:
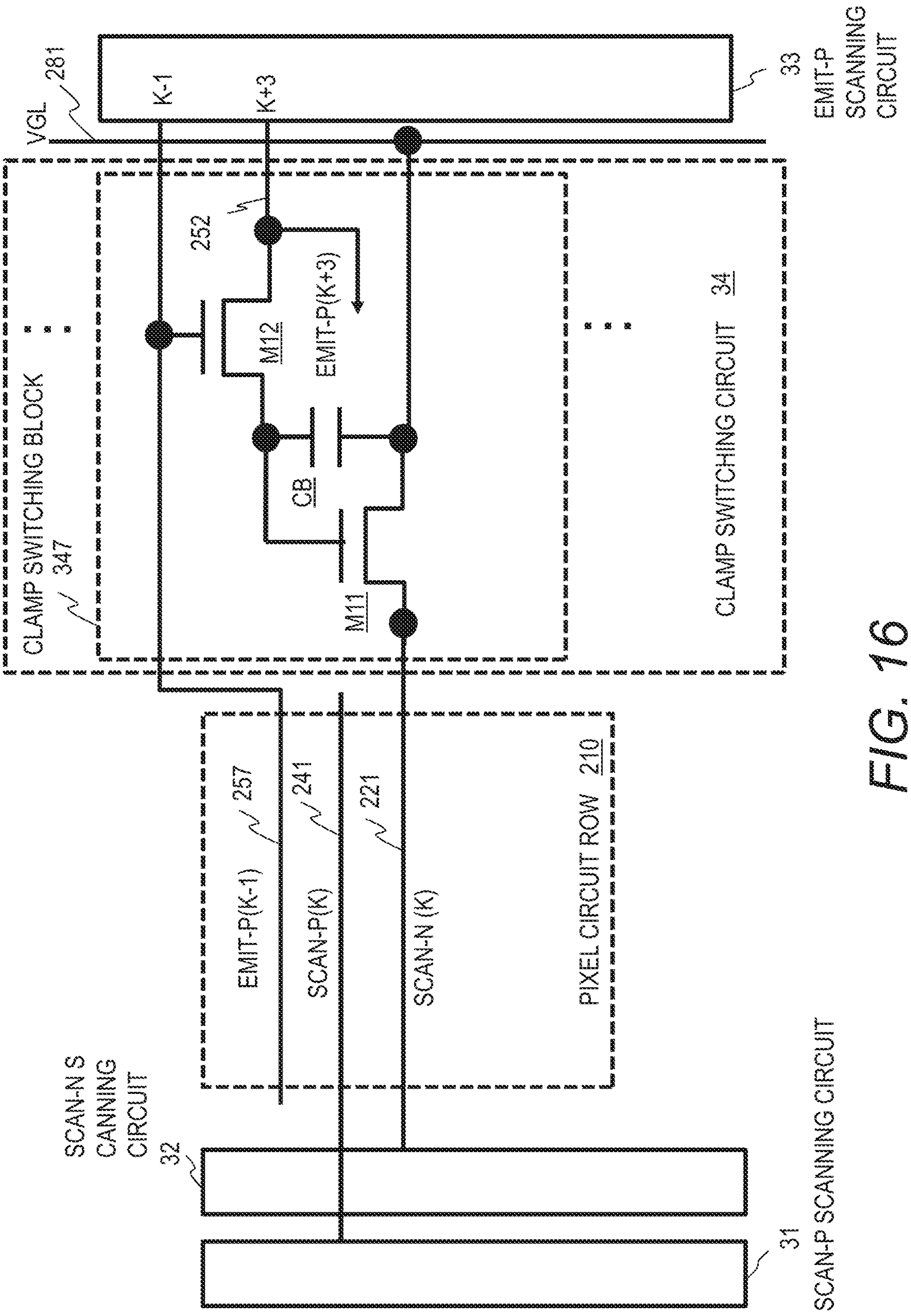
FIG. 16 illustrates a configuration example of a clamp switching block included in a clamp switching circuit.

FIG. 16 illustrates a configuration example of a clamp switching block 347 included in a clamp switching circuit 34. Differences from the clamp switching block 341 described with reference to FIGS. 3A and 4 are mainly described. The pixel circuits have the configuration of the pixel circuit 280 described with reference to FIG. 15.

The clamp switching block 347 has a configuration where the clamp switching transistor M13 is excluded from the clamp switching block 341. The gate of the transistor M12 is supplied with the emission control scanning signal EMIT-P(K−1), instead of the emission control scanning signal EMIT-P(K). The emission control scanning signal EMIT-P (K−1) is transmitted by a signal line 257.

Figure 17:
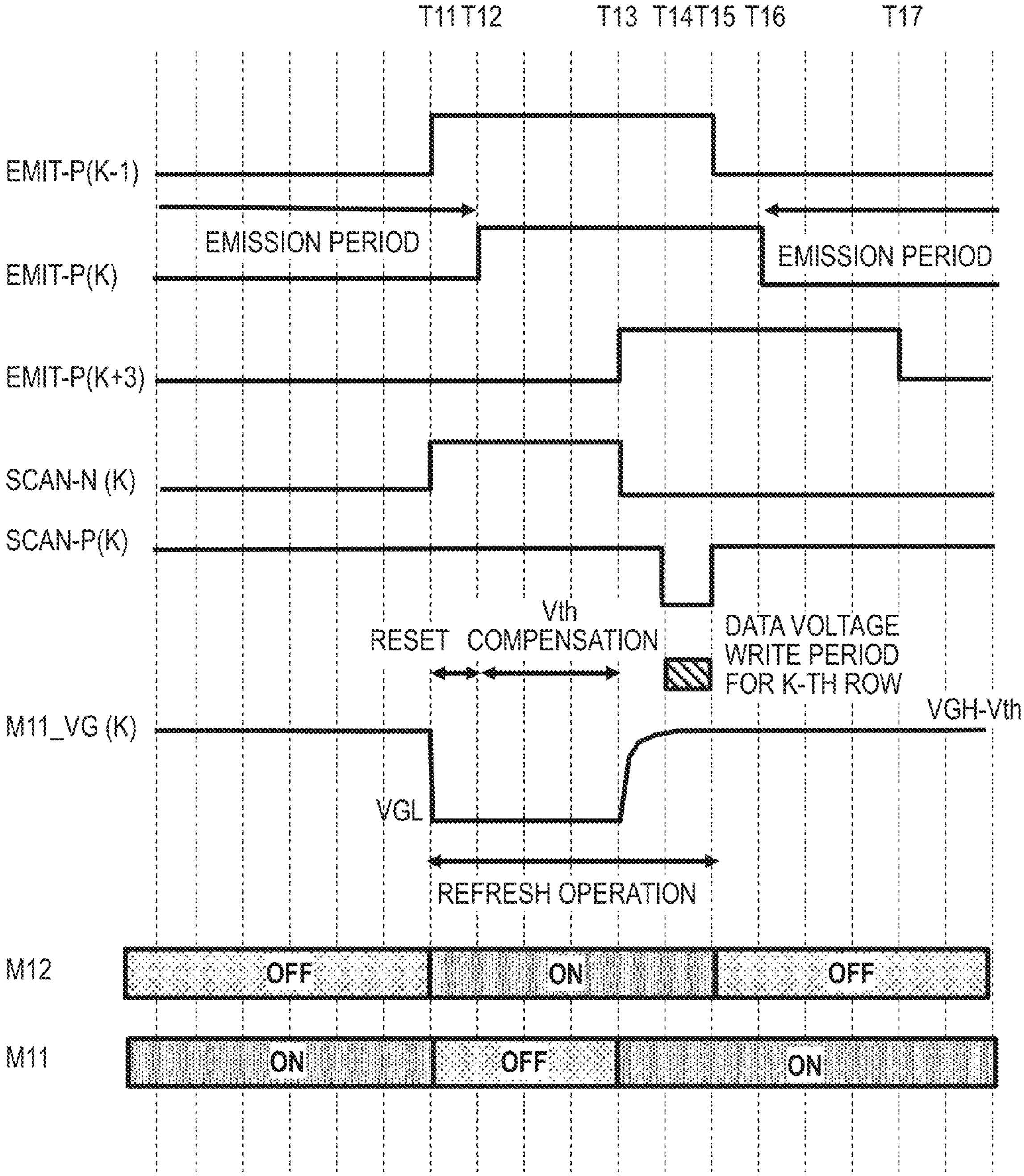
FIG. 17 is a timing chart of the signals for controlling the clamp switching block in FIG. 16.

FIG. 17 is a timing chart of the signals for controlling the clamp switching block 347 in FIG. 16. The levels of each signal in the chart correspond to the physical potential levels. The high-level potential of each signal is VGH and the low-level potential is VGL. The scanning signal SCAN-N(K) is at a high-level potential for a shorter time than it is at a low-level potential in one frame period.

The period prior to a time T11 is an emission period for (K−1)th row. At the time T11, the emission control scanning signal EMIT-P(K−1) changes from a low-level potential to a high-level potential and the scanning signal SCAN-N(K) changes from a low-level potential to a high-level potential. The emission control scanning signals EMIT-P(K) and EMIT-P(K+3) remain at the low-level potential and the scanning signal SCAN-P(K) remains at a high-level potential.

The OLED elements E1 in the pixels in the (K−1)th row stop emitting light at the time T11. The period from the time T11 to a time T12 is a reset period of the pixel circuit 280. In response to the change of the scanning signal SCAN-N (K), the transistors M23, M24, and M26 in the pixel circuit 280 turn ON. The transistor M22 remains OFF and the transistor M25 remains ON.

The potential at the intermediate node between the capacitive elements C21 and C22 changes to the reference potential V-REF. The electric charge stored in the capacitive element C22 is discharged to initialize (reset) the gate potential of the driving transistor M21. The anode potential of the OLED element E1 falls to the reset potential V-RST.

In response to the emission control scanning signal EMIT-P(K−1), the transistor M12 in the clamp switching block 347 turns from OFF to ON. The gate potential (M11_VG(K)) of the clamp switching transistor M11 changes from (VGH−Vth) to VGL, where VGH is a high-level potential and Vth is the threshold voltage of the switching transistor M12.

At the time T12, the emission control scanning signal EMIT-P(K) changes from the low-level potential to the high-level potential and the OLED elements E1 of the pixels in the K-th row stop emitting light. The potentials of the other signals are fixed and do not change. In response to the change of the emission control scanning signal EMIT-P(K), the transistor M25 in the pixel circuit 280 turns OFF. This state is maintained from the time T12 until the time T13. The period from the time T12 to the time T13 is a threshold voltage compensation period for the driving transistor M21. The gate-source voltage of the driving transistor M21 falls to the threshold voltage.

At a subsequent time T13, the emission control scanning signal EMIT-P(K+3) changes from the low-level potential to the high-level potential and the scanning signal SCAN-N(K) changes from the high-level potential to the low-level potential. The emission control scanning signal EMIT-P(K) remains at the high-level potential. In response to the change of the scanning signal SCAN-N(K), the transistors M23, M24, and M26 in the pixel circuit 280 turn OFF.

In response to the change of the emission control scanning signal EMIT-P(K+3), a voltage (VGH−Vth−VGL) is stored across the terminals of the capacitive element CB. The gate-source voltage (M11_VG(K)) of the clamp switching transistor M11 changes from VGL to (VGH−Vth). Accordingly, the clamp switching transistor M11 turns from OFF to ON.

At a subsequent time T14, the scanning signal SCAN-P (K) changes from the high-level potential to a low-level potential. The other signals do not change. In response, the transistor M22 in the pixel circuit 280 turns ON. The period from the time T14 to a subsequent time T15 is a period to write a data voltage. The data signal is applied to the intermediate node between the capacitive elements C21 and C22. The period from the time T11 to the time T15 is a period for refresh operation.

At the time T15, the emission control scanning signal EMIT-P(K−1) changes from the high-level potential to the low-level potential. The scanning signal SCAN-P(K) changes from the low-level potential to the high-level potential. The other signals do not change. In response to the change of the scanning signal SCAN-P(K), the transistor M22 in the pixel circuit 280 turns OFF and the data voltage write period ends.

In response to the change of the emission control scanning signal EMIT-P(K−1), the switching transistor M12 in the clamp switching block 347 turns from ON to OFF. Since the capacitive element CB holds a voltage, the clamp switching transistor M11 remains ON. The clamp switching transistor M11 is maintained to be ON until the time T11 of the next frame.

At a subsequent time T16, the emission control scanning signal EMIT-P(K) changes from the high-level potential to the low-level potential. The other signals do not change. The transistor M25 turns ON. The period after the time T16 is an emission period.

At a subsequent time T17, the emission control scanning signal EMIT-P(K+3) changes from the high-level potential to the low-level potential. The other signals do not change. Since the switching transistor M12 in the clamp switching block 347 is kept OFF, the state of the switching transistor M11 is maintained.

In the example illustrated in FIG. 17, the periods from the time T11 to the time T12, from the time T13 to the time T14, and from the time T15 to the time T16 have the same length equal to a data voltage write period (one horizontal (1H) period). The period from the time T12 to the time T13 has a length three times as long as the data voltage write period and the period from the time T16 to the time T17 has a length three times as long as the data voltage write period.

During the period from the time T11 to the time T13 in which the scanning signal SCAN-N(K) is at a physical high-level potential (a logical high level), the clamp switching transistor M11 is maintained to be OFF. This operation eliminates interference with appropriate writing of data signal to the pixel circuit 280.

In the example described with reference to FIG. 17, the clamp switching transistor M11 is maintained to be ON from the time T13 to the time T11 of the next frame. That is to say, the scanning line 221 for the scanning signal SCAN-N(K) is connected to the VGL power line 281 and supplied with the low-level potential VGL from the VGL power line 281. This operation effectively prevents the low-level potential of the scanning line 221 from drifting to cause leakage of current from the n-type TFTs in the pixel circuit 280.

The configuration example described with reference to FIGS. 16 and 17 controls the clamp switching block 347 with the emission control scanning signals EMIT-P(K−1) and EMIT-P(K+3). In order to keep the clamp switching transistor M11 OFF during the period from the time T11 to the time T13, the emission control scanning signal EMIT-P for a different pixel circuit row can be used. For example, an emission control scanning signal EMIT-P prior to the emission control scanning signal EMIT-P(K−1) or an emission control scanning signal EMIT-P later than the emission control scanning signal EMIT-P(K+3) can be used.

As set forth above, embodiments of this disclosure have been described; however, this disclosure is not limited to the foregoing embodiments. Those skilled in the art can easily modify, add, or convert each element in the foregoing embodiments within the scope of this disclosure. A part of the configuration of one embodiment can be replaced with a configuration of another embodiment or a configuration of an embodiment can be incorporated into a configuration of another embodiment.

What is claimed is:

1. A display device comprising:

a display region including a plurality of pixel circuits, each including a plurality of n-type transistors;

a first scanning circuit;

a second scanning circuit; and a clamp switching circuit, wherein each of the plurality of pixel circuits is controlled by at least a first scanning signal and a second scanning signal, wherein the first scanning circuit supplies the first scanning signal to first scanning signal lines for the plurality of pixel circuits, wherein the second scanning circuit supplies the second scanning signal to second scanning signal lines for the plurality of pixel circuits, wherein the first scanning signal lines are connected, respectively, to turn ON/OFF the plurality of n-type transistors in a given one of the plurality of pixel circuits to perform a refresh operation including writing a data voltage to the given pixel circuit, wherein the second scanning signal is connected to control whether to supply lighting current to a light-emitting element in the given pixel circuit, wherein inputs of the clamp switching circuit are connected to the second scanning signal lines, wherein outputs of the clamp switching circuit are connected to the first scanning signal lines, wherein the clamp switching circuit is controlled by the second scanning signal at a time different from times at which the first scanning lines for the given pixel circuit changes to a low-level potential, to keep the first scanning signal lines for the given pixel circuit that has changed to the low-level potential at the low-level potential for at least a part of a period of supplying lighting current to the light-emitting element, and wherein the time at which the clamp switching circuit is controlled to start keeping the first scanning signal lines for the given pixel circuit at the low-level potential is after one horizontal period or more have passed since the first scanning circuit has changed the potentials of the first scanning signal lines for the given pixel circuit to the low-level potential.

2. The display device according to claim 1, wherein the first scanning circuit and the second scanning circuit comprise transistors, all of the transistors in the first and second scanning circuits being p-type transistors, and wherein a period where the first scanning signal is at a high-level potential is shorter than a period where the first scanning signal is at the low-level potential in each frame period.

3. The display device according to claim 1, wherein the given pixel circuit includes a p-type transistor and an n-type transistor, and wherein the second scanning signal controls ON/OFF of the p-type transistor included in the given pixel circuit.

4. The display device according to claim 1, wherein the output of the clamp switching circuit is disconnected from the first scanning signal line for a period where the first scanning signal is at a high-level potential.

5. A display device comprising:

a display region including a plurality of pixel circuits;

a first scanning circuit;

a second scanning circuit; and a clamp switching circuit, wherein each of the plurality of pixel circuits is controlled by at least a first scanning signal and a second scanning signal, wherein the first scanning circuit supplies the first scanning signal to first scanning lines for the plurality of pixel circuits, wherein the second scanning circuit supplies the second scanning signal to second scanning lines for the plurality of pixel circuits, wherein the first scanning signal is a scanning signal that turns ON/OFF an n-type transistor in a pixel circuit for refresh operation including writing a data voltage to the pixel circuit, wherein the second scanning signal is a scanning signal that controls whether to supply lighting current to a light-emitting element in the pixel circuit, wherein an output of the clamp switching circuit is connected to a first scanning signal line, wherein the clamp switching circuit is controlled by the second scanning signal to keep the first scanning signal line at a low-level potential for at least a part of an emission period of the light-emitting element, wherein all transistors in the first scanning circuit and the second scanning circuit are p-type transistors, and wherein a period where the first scanning signal is at a high-level potential is shorter than a period where the first scanning signal is at the low-level potential in each frame period, and wherein one refresh cycle has a length of two or more frame periods.

6. A display device comprising:

a display region including a plurality of pixel circuits;

a first scanning circuit;

a second scanning circuit; and a clamp switching circuit, wherein each of the plurality of pixel circuits is controlled by at least a first scanning signal and a second scanning signal, wherein the first scanning circuit supplies the first scanning signal to first scanning lines for the plurality of pixel circuits, wherein the second scanning circuit supplies the second scanning signal to second scanning lines for the plurality of pixel circuits, wherein the first scanning signal is a scanning signal that turns ON/OFF an n-type transistor in a pixel circuit for refresh operation including writing a data voltage to the pixel circuit, wherein the second scanning signal is a scanning signal that controls whether to supply lighting current to a light-emitting element in the pixel circuit, wherein an output of the clamp switching circuit is connected to a first scanning signal line, and wherein the clamp switching circuit is controlled by the second scanning signal to keep the first scanning signal line at a low-level potential for at least a part of an emission period of the light-emitting element, wherein the clamp switching circuit includes:

a first n-type switching transistor; and a capacitive element between a gate and a source of the first n-type switching transistor, wherein the source of the first n-type switching transistor is connected to a low-level potential line, wherein a drain of the first n-type switching transistor is connected to the first scanning signal line, and wherein the capacitive element holds a voltage to keep the first n-type switching transistor in an ON-state for the at least a part of an emission period.

7. The display device according to claim 6, wherein the first n-type switching transistor is kept in an OFF-state for a period where the first scanning signal is at a high-level potential.

8. The display device according to claim 6, wherein the second scanning signal controls ON/OFF of a p-type transistor included in the pixel circuit, wherein the clamp switching circuit includes a second n-type switching transistor, wherein a gate of the second n-type switching transistor is connected to a second scanning signal line, and wherein one of source/drain regions of the second n-type switching transistor is connected to the gate of the first n-type switching transistor and the capacitive element.

9. The display device according to claim 8, wherein the other source/drain region of the second n-type switching transistor is connected to a second scanning signal line for a later stage than the second scanning signal line connected to the gate of the second n-type switching transistor.

* * * * *